United States Patent
Van Der Vleuten et al.

(10) Patent No.: US 11,533,516 B2
(45) Date of Patent: Dec. 20, 2022

(54) METHODS AND APPARATUSES FOR ENCODING AN HDR IMAGES, AND METHODS AND APPARATUSES FOR USE OF SUCH ENCODED IMAGES

(71) Applicant: KONINKLIJKE PHILIPS N.V., Eindhoven (NL)

(72) Inventors: Renatus Josephus Van Der Vleuten, Veldhoven (NL); Mark Jozef Willem Mertens, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 149 days.

(21) Appl. No.: 16/985,391

(22) Filed: Aug. 5, 2020

(65) Prior Publication Data
US 2020/0366943 A1 Nov. 19, 2020

Related U.S. Application Data

(63) Continuation of application No. 16/112,901, filed on Aug. 27, 2018, now Pat. No. 10,779,013, which is a
(Continued)

(30) Foreign Application Priority Data

May 28, 2014 (EP) .................................. 14170157

(51) Int. Cl.
  *G06V 10/00* (2022.01)
  *H04N 19/98* (2014.01)
  (Continued)

(52) U.S. Cl.
  CPC ............. *H04N 19/98* (2014.11); *G06T 5/009* (2013.01); *G06T 9/00* (2013.01); *G09G 3/2003* (2013.01);
  (Continued)

(58) Field of Classification Search
  CPC ...... H04N 19/98; H04N 19/186; H04N 19/44; H04N 19/46; H04N 7/0117; H04N 19/30;
  (Continued)

(56) References Cited

U.S. PATENT DOCUMENTS 6,864,916 B1 * 3/2005 Nayar .................. H04N 5/2355
  348/229.1
7,433,514 B2 * 10/2008 Sloan .................. H04N 1/6027
  382/167
(Continued)

FOREIGN PATENT DOCUMENTS

EP     2406959 A1     1/2012
WO  20051040035 A1   11/2005
(Continued)

OTHER PUBLICATIONS

Van Der Vleuten et al, "Proposed Electro-Optical Transfer Function (EOTF) for High Dynamic Range (HDR) Video Delivery", MPEG Meeting No. M34274, Jul. 1, 2014, XP030062647, pp. 1-3.
(Continued)

*Primary Examiner* — Amir Alavi

(57) ABSTRACT

To enable a good HDR image or video coding technology, being able to yield high dynamic range images as well as low dynamic range images, we invented a method of encoding a high dynamic range image (M_HDR), comprising the steps of:
  converting the high dynamic range image to an image of lower luminance dynamic range (LDR_o) by applying a) scaling the high dynamic range image to a predetermined scale of the luma axis such as [0,1], b) applying a sensitivity tone mapping which changes the brightnesses of pixel colors falling within at least a subrange comprising the darker colors in the high dynamic range image, c) applying a gamma function, and d) applying an arbitrary monotonically increasing
(Continued)

function mapping the lumas resulting from performing the steps b and c to output lumas of the lower dynamic range image (LDR_o); and outputting in an image signal (S_im) a codification of the pixel colors of the lower luminance dynamic range image (LDR_o), and outputting in the image signal (S_im) values encoding the functional behavior of the above color conversions as metadata, or values for the inverse functions, which metadata allows to reconstruct a high dynamic range image (Rec_HDR) from the lower luminance dynamic range image (LDR_o).

12 Claims, 6 Drawing Sheets

Related U.S. Application Data continuation of application No. 15/306,873, filed as application No. PCT/EP2015/055831 on Mar. 19, 2015, now Pat. No. 10,075,738.

(51) Int. Cl.

| | |
|---|---|
| G09G 3/20 | (2006.01) |
| H04N 19/30 | (2014.01) |
| H04N 19/46 | (2014.01) |
| G09G 5/10 | (2006.01) |
| H04N 5/20 | (2006.01) |
| G06T 9/00 | (2006.01) |
| H04N 19/186 | (2014.01) |
| H04N 19/44 | (2014.01) |
| G06T 5/00 | (2006.01) |
| H04N 7/01 | (2006.01) |

(52) U.S. Cl.
CPC ............ *G09G 5/10* (2013.01); *H04N 5/20* (2013.01); *H04N 7/0117* (2013.01); *H04N 19/186* (2014.11); *H04N 19/30* (2014.11); *H04N 19/44* (2014.11); *H04N 19/46* (2014.11); *G06T 2207/10024* (2013.01); *G06T 2207/20208* (2013.01); *G09G 2320/0271* (2013.01); *G09G 2320/0276* (2013.01); *G09G 2320/0673* (2013.01); *G09G 2340/02* (2013.01); *G09G 2340/06* (2013.01)

(58) Field of Classification Search
CPC ......... G06T 5/009; G06T 9/00; G09G 3/2003; G06K 9/623
See application file for complete search history.

(56) References Cited

U.S. PATENT DOCUMENTS

| | | | |
|---|---|---|---|
| 7,742,646 B1 | 6/2010 | Donovan | |
| 8,248,486 B1 | 8/2012 | Ward et al. | |
| 8,463,035 B2* | 6/2013 | Bechtel | B60R 1/04 |
| | | | 382/167 |
| 8,576,445 B2* | 11/2013 | Mebane | H04N 1/6058 |
| | | | 358/1.9 |
| 8,781,248 B2* | 7/2014 | Wang | H04N 5/202 |
| | | | 348/673 |
| 8,854,512 B2* | 10/2014 | Klijn | H04N 5/202 |
| | | | 348/222.1 |
| 8,957,984 B2 | 2/2015 | Vidal-Naquet | |
| 9,076,224 B1* | 7/2015 | Shah | H04N 19/117 |
| 9,098,906 B2 | 8/2015 | Bruls | |
| 9,516,290 B2* | 12/2016 | Lin | H04N 5/23229 |
| 9,699,482 B2 | 7/2017 | Mertens | |
| 10,075,738 B2* | 9/2018 | Van Der Vleuten | G09G 5/10 |
| 10,182,247 B2 | 1/2019 | Mertens | |
| 10,362,337 B2 | 7/2019 | Mertens | |
| 10,366,672 B2 | 7/2019 | Van Mourik | |
| 10,779,013 B2* | 9/2020 | Van Der Vleuten | H04N 19/30 |
| 2012/0051635 A1 | 3/2012 | Kunkel | |
| 2012/0134551 A1 | 5/2012 | Wallace | |
| 2012/0147953 A1 | 6/2012 | El-Mahdy | |
| 2013/0177066 A1 | 7/2013 | Gish | |
| 2015/0201222 A1 | 7/2015 | Mertens | |
| 2015/0221280 A1 | 8/2015 | Van Der Vleuten | |
| 2016/0057334 A1* | 2/2016 | Ninan | H04N 5/23232 |
| | | | 348/43 |
| 2016/0371822 A1 | 12/2016 | Boitart | |
| 2017/0078706 A1 | 3/2017 | Mertens | |
| 2017/0127069 A1 | 5/2017 | Mertens | |
| 2017/0180759 A1 | 6/2017 | Mertens | |
| 2018/0027216 A1* | 1/2018 | Bechtel | H04N 19/117 |
| | | | 348/148 |
| 2018/0367819 A1 | 12/2018 | Van Der Vleuten | |

FOREIGN PATENT DOCUMENTS

| | | |
|---|---|---|
| WO | 2010105036 A1 | 9/2010 |
| WO | 2012147022 A2 | 11/2012 |
| WO | 2012153224 A1 | 11/2012 |
| WO | 2013046095 A1 | 4/2013 |
| WO | 2013046096 A1 | 4/2013 |
| WO | 2014128586 A1 | 8/2014 |
| WO | 2015007505 A1 | 1/2015 |

OTHER PUBLICATIONS

Tourapis et al, "Report On the XYZ/HDR Exploratory Experiment 1 (EE1): Electro-Optical Transfer Functions for XYZ/HDR Delivery", PGEG Meeting No. M34165, Jul. 2, 2014, XP030062538, pp. 1-20.

Stessen et al, "Chromaticity Based Color Signals", MPEG Meeting, No. M34335, Jul. 3, 2014, XP030062708, pp. 1-16.

DVB Organization: "TM-AVCO671_PHILIPS-HDR-PROPOSAL-DVB-2014-03-30.PDF", DVB, Digital Video Broadcasting, 2014, XP017842592, pp. 1-21.

Segall et al, "Tone Mapping SEI", JVT Meeting, No. JVT-S087, Apr. 1, 2006, XP030006466, pp. 1-12.

Lasserre et al, "High Dynamic Range Video Coding", JCT-VC Meeting, No. JCTVC-P0159-V3, Jan. 15, 2014, XP030115678, pp. 1-9.

Reinhard et al, "High Dyanmic Range Imaging: Acquisition, Display, and Image-Based Lighting", Morgan Kaufmann Seriesin Computer Graphics, Nov. 21, 2005, XP040425801, Pages.

Kikuchi et al, "Compression of High Dynamic Range Images in the YU'V' Color Space", ITC-CSCC, 2013, pp. 631-634.

* cited by examiner

METHODS AND APPARATUSES FOR ENCODING AN HDR IMAGES, AND METHODS AND APPARATUSES FOR USE OF SUCH ENCODED IMAGES

CROSS REFERENCE TO PRIOR APPLICATIONS

This application is a Continuation of application Ser. No. 16/112,901 filed Aug. 27, 2018 which is a Continuation of application Ser. No. 15/306,873, filed Oct. 26, 2016, which is U.S. National Phase application under 35 U.S.C. § 371 of International Application No. PCT/EP2015/055831, filed Mar. 19, 2015, which claims the benefit of European Patent Application No. 14170157.3, filed May 28, 2014. These applications are hereby incorporated by reference herein.

FIELD OF THE INVENTION

The invention relates to encoding of one (i.e. a still) but preferably more (i.e. video) High Dynamic Range image(s), and corresponding technical systems and methods to convey the necessary coded image information to a receiving side, and decoders to decode the coded images, and ultimately make them available for display.

A HDR image is an image which encodes the textures of a HDR scene (which may typically contain both very bright and dark regions), in such a manner, with sufficient information for high quality encoding of the color textures of the various captured objects in the scene, that a visually good quality rendering of the HDR scene can be done on a HDR display with high peak brightness like e.g. 5000 nit. In our HDR encoding framework developed over the previous years, we also want at the same time to encode various encompassed dynamic range subviews on that scene, which can serve as good driving images for various displays of successively reduced dynamic range, at least an LDR image look suitable for driving e.g. a 100 nit peak brightness display.

Furthermore an HDR encoding is preferably technically designed so that it not only matches relatively well with existing video coding technologies, but even can fit into the current image or video encoding frameworks of existing technology, like e.g. blu-ray disk storage (and its limitations like amount of storage memory, but also already substantially all other standardized aspects), or HDMI cable connections, or other image transmission or storage systems, etc. In particular, HDR encoding systems which use two encoded images per time instant (e.g. an LDR image, and an image having local brightening intensities for boosting each pixel to an HDR image pixel) are seen by especially apparatus manufacturers as needlessly complex.

HDR video (or even still image) encoding has only recently been tentatively researched and has been a daunting task up to now, and the typical belief is that one either needs to go towards significantly more bits, for encoding the brightnesses above the LDR range of scene objects (e.g. encodings which encode scene luminances directly), or one needs some two-layer approach, wherein e.g. in addition to an object reflectance image there is a illumination boost image, or similar decomposition strategies. Alternative approaches, like e.g. the HDR coding system of Dolby, typically always use such a two-layer HDR encoding technology (see U.S. Pat. No. 8,248,486B1). Wo2010/105036 is another example of such a 2-image-per-time-instant encoding system from Dolby. Some simple fixed tone mapping TM (e.g. emulating the behavior of classical analog celluloid photography) can be used to map a LDR image to a HDR grading corresponding therewith, or vice versa. This may be any not very correctly mapping function (because the grader may have used complicated optimization decisions in say his LDR grading), so there may be a considerable difference between the prediction of the original say HDR image, and the original HDR image itself, but that is no problem because the system can send the differences as a second correction image (residual bit stream 742).

Another example of such a two-image encoding system is the technicolor HDR coding system (document JCTVC-P0159r1, of the $16^{th}$ meeting of the Joint Cooperative Team on video coding of ITU-T SG 16 WP3, San Jose of 9-17 Jan. 2014) which encodes as a first image a low resolution signal being the local illumination as it will typically be generated in a modulated 2D LED backlight, and the second image is a texture image of typically lower dynamic range modulations upon that low frequency signal, which will typically be generated upon display by appropriate LCD valve driving signals.

Philips has recently invented a much simpler single image approach (still largely unpublished, but some aspects can be found in WO2012/147022 and WO2012/153224), which is a new direction in image and video coding, and not only a priori not easy to imagine, but also when actually doing it leading to many new technical issues to be solved, which however works nicely in practice.

With "high dynamic range" (HDR) we mean that either the image(s) as captured from the capturing side have a high luminance contrast ratio compared to legacy LDR encoding (i.e. object luminance contrast ratios of 10.000:1 or more may be handled by the coding, and all components of the image handling chain up to rendering; and captured object luminances may be above 1000 nit, or more specifically, may typically be reproduced/rendered above 1000 nit to, given the reproduction environment, generate some desired appearance of say a lit lamp or sunny exterior). And typically the rendering of such image(s) is HDR (i.e. the images must be suitable in that they contain information sufficient for high quality HDR rendering, and preferably in a technically easy to use manner), meaning the image(s) are rendered or intended to be rendered on displays with peak brightness of at least 1000 nit (not implying they can't and needn't alternatively be rendered on LDR displays of e.g. 100 nit peak brightness, typically after suitable color mapping).

BACKGROUND OF THE INVENTION

Recently a number of HDR encoding technologies have been proposed, like e.g. the dual layer method of Dolby (WO2005/1040035). However, the industry is currently still looking for a pragmatic HDR video (/image) encoding technology with fits with (a balance of) all requirements, such as the very important factors like amount of data but also computational complexity (price of ICs), ease of introduction, versatility for the artists to create whatever they like, etc. In particular, a dual layer approach is seen as needlessly complex. One would ideally like to be able to design a coding technology which fits with legacy encoding, such as e.g. DCT-based MPEG HEVC encoding. A problem is that this is somewhat counter-intuitive: how can one encode a HDR image, which should by definition be something different from an LDR image, typically having a larger amount of interesting brightness/luminance ranges, in a technology optimized for containing LDR images? These legacy LDR image handling/coding systems were designed and optimized to work with typical LDR imaging scenarios, which are normally well-lit with e.g. a 4:1 in studio illumination ratio (or e.g. 10:1), giving for most of the objects (which can vary in reflectance between say 85% for white and 5% for black) in the view a total contrast ratio of about 68:1 (resp. 170:1). If one looks at relative rendering (i.e. mapping the image white to the available display white) of the object luminances starting from a peak white, a typical early LCD monitor without local dimming would have had something like 100 nit white and 1 nit black which would match with the image contrast ratio, and typically one thought that on average CRT systems which might have been watched also during the day would have something like a 40:1 capability. Having a standard legacy luminance code allocation gamma function of 2.2 in these systems seemed satisfactorily for most scenarios of even higher scene contrast. Although some in those days regarded as acceptable errors were made, such errors of rendering of badly encoded high luminance scene regions (e.g. hard clipping of bright exteriors behind a window) were also acceptable because LDR displays couldn't render those object luminances physically accurate anyway.

However there are scenarios for which there is now a desire to improve the rendering, like e.g. an indoors scene in which one can simultaneously see the sunny outdoors, in which case there may be an illumination ratio of 100:1 or even more. With linear relative rendering (i.e. focusing on the brightest encoded regions firstmost, or equivalently the middle grey of the brightest scene regions, and mapping image white to display white), the indoors white would map to psychovisual black to the viewer! So in LDR those sunny regions will typically show up as (soft)clipped (typically already in the encoded image having difficult to discriminate codes around the maximum 255 for those pixels). However, on a HDR display we would like to show them both bright and colorful. That would give a much more naturalistic and spectacular rendering of such scenes (as if you're really on holiday in Italy), but even scenes in which the higher brightness content is only composed of some specular reflections already show a major visual quality improvement. If not already artefacts like clipping or quantization errors look annoying on e.g. a 5000 or 10000 nit display, at least we want to be able to drive such HDR displays with the right kind of image, so that the rendered images will be as beautiful as the HDR display allows.

Classical thinking was however that to encode additional over-brightness ranges, one would need to have (much) more bits, which are the higher bits which encode the object luminances above an LDR range. That could happen either by natively encoding in single larger code words (such as OpenEXR with 16 bits of which a sign bit, 5 bits exponent, and 10 bits mantissa, or Ward's LogLuv encoding, which mathematically rigorously tries to capture the entire world of possible object luminances with high precision), or by using a first layer with standard LDR range codes (e.g. a classical JPEG approximation of the HDR image), and a second layer to improve such pixel luminances to higher brightness (e.g. a boost image to boost each pixel if needed to a higher luminance, i.e. a multiplication of two such 8 bit images being equivalent to a single linear 16 bit code).

A major practical problem to be solved when designing a practical HDR coding technology, in addition to the fact that of course it must be able to handle a huge range of different HDR images, is that hardware manufacturers desire lower amounts of bits per code word (channel, i.e. the luma, and two chromatic channels) however, and although our below proposed technology can also work with larger bit words, we come with a solution that works nicely under a limitation of 10 bits for at least a luminance (or more precisely a luma) channel (note that although we elucidate the embodiments with a luminances channel, our concepts may mutatis mutandis be embodied as working on (linear or non-linear) RGB color representations, etc.). Furthermore, we developed a framework which can do in a dual philosophy both the color pixels encoding (of the HDR look via an LDR image) and the color appearance conversion for several rendering scenarios (i.e. the needed optimal looks for rendering a scene on several displays with different peak brightness, e.g PB=800 nit) in a functional manner, which means only functions need to be co-encoded when encoding the look of at least one further grading, and specifically an HDR look in addition to an LDR look, instead of for each picture at least a second picture.

We have currently two categories of HDR encoding systems, since the market would like such versatility in an encoding system, given the various players and their different needs. In the mode-i (or HDR-look encoded as a sole defining image, e.g. on a BD disk, or an stream of AVC or HEVC images over a network connection) system we use a HDR-look image as the sole pixel image, which is used to encode the object color textures and shapes (see in WO2015007505 of applicant how such a sole HDR image can be sent to a receiver to define the pixel colors of at least the HDR look, and how with appropriate re-grading functions the receiver can calculate by processing the colors in that image other look images). By this we mean that we take the original HDR master grading image, i.e. an image optimally color graded to look best on a reference HDR display like e.g. typically a 5000 nit peak brightness display, and only minimally transform this: basically only apply a code allocation function or Opto-electronic transfer function OETF (note that although this OETF defines how scene luminances as captured e.g. by a camera are transferred to luma codes, television engineers instead like to specify the inverse function being the electro-optical transfer function EOTF to go from luma codes to reference display rendered luminances) by using the OETF optimally allocates the available e.g. 10 bit of codes for the luma Y' channel over all brightness values one needs to be able to make on a reference [0-5000] nit display. Other desired gradings for displays of different peak brightness can then be made by transforming this HDR-look image. In our framework we allow for this display look tunability by typically making only one second grading which is on an other extreme end of the range of possible displays to be served, namely a look which is optimal or reasonable according to the content creator/color grader for a 100 nit peak brightness display (which is typically the reference display for the category of LDR displays). Note that this is a co-encoding of a further look rather than a mere creation-side recoloring step. This required color transformation is determined by applying mapping functions such as gamma functions realizing a global brightness readjustment (e.g. brightening the darker colors in the image), arbitrary S-shaped or inverse S-shaped curves to adjust local contrast, color saturation processing functions to adjust e.g. the saturation to the corresponding brightness of some objects or regions in the image etc. We can liberally co-encode those functions (whichever functions we need as long as they belong to a limited set of basis functions which the receiver can in a standardized manner understand) as metadata associated with the pixellized HDR-look image, in which case we parametrically DEFINE the second LDR-look grading image from the HDR-look image (i.e. we need not encode that LDR-look image as a pixel image anymore). Note carefully the difference with two layer encoding systems: in our system the color transformation functions are all there is encoded about the second look to be able to re-grade the second look at the receiver, so rather than the rough approximate functions of 2-image technologies, our functions contain the full smart knowledge of how the illuminations of the various objects should behave in various rendering look according to the content creator! Given this knowledge of how the creating artists wants the look to transform from the first look for displays with a first level of color rendering capabilities to a second look for displays with a second level of color rendering capabilities (in particular the display peak brightness), a display with intermediate capabilities (e.g. 1200 nit peak brightness) can then automatically come to a more optimal driving image for its rendering situation by using the knowledge in the two gradings and interpolating (e.g. the display may do an asymmetric mixing of the two pixellized images of the HDR-look and the derived LDR-look image from the HDR-look image and the functional transformations, in which the multiplicative mixing percentages are determined by how close to the HDR or LDR display the actual display is on a psychovisual non-linear scale), which will be better than driving the display with either the original HDR-look image or the LDR-look image.

This is a powerful yet simple definition of not solely a single (HDR) image look on a scene (e.g. a 5000 nit rendering), but a full framework for deriving reasonable renderings of the scene for various possible displays in the field like at a consumer's home (and even potentially adaptation to viewing environment e.g. by applying a post-gamma modeling the changed contrast sensitivity of human vision under various surround illuminances). It is mainly useful e.g. for applications/scenarios in which a creator has made a nice HDR version of their content, and wants to have firstmost this HDR look in the actual encoding sent to receivers (e.g. on a HDR BD disk, or by ordering a HDR movie online over the internet, or a HDR television broadcast, etc.). It is not necessary that a customer who purchases this content version actually has a HDR display, since he can purchase it for later when he does have a HDR display and can now use the HDR-2-LDR conversion, but it would be the preferred option when the customer wants content for his HDR display.

Whereas the above HDR-look manner of encoding HDR scenes (as explained mode i being that at least HDR look images encoded as a pixel image, but in fact also further looks on that same scene are encoded but then parametrically with color transformation functions, such as e.g. a clipping embodiment, in which the LDR-look isolates a subrange of the HDR image and clips the rest) already poses significant technical challenges for coming to a pragmatic new technical system for future image but mostly also video encoding (taking into account such factors as simplicity of IC design for the hardware manufacturers, yet allowing content makers to create whatever beautiful HDR content like sci-fi movies, spectacular television shows, or nature documentaries, etc. they want to make, with many creative HDR effects such as lamps which seem really lit), the market desired yet another layer of complexity, which we will teach in this patent description.

Namely, for some (which we will call mode-ii) applications one may want to have an LDR-look image as the sole pixellized image encoding the scene objects, which is e.g. written as sole image on a blu-ray disk. Although the content creator also cares much about the quality of the HDR look, he very much focuses on the LDR look being similar as it would be with legacy technologies. There will then typically be function parameters co-encoded in associatable metadata to derive a HDR look image by upgrading the LDR-look image which was communicated in the image signal S_im. There may be various reasons for choosing this mode-ii variant (or LDR-look), which may e.g. be for legacy systems which are unable to do any processing (e.g. if one prefers to encode the sole image in a particular embodiment which encodes the colors as Y'uv colors rather than a YCrCb encoding, one could still encode this in a legacy HEVC framework by pretending the Y'uv image is a strangely colored YCrCb image and further using legacy DCT-based encoding schemes, like standardized in one of the members of the MPEG codec family), but also for applications which need a LDR look (e.g. viewing a movie on a low brightness portable display) and may not want to do too much processing. Or perhaps the creator doesn't want to invest too much time in creating a perfect HDR look (but e.g. only a quickly makes one by doing minor finetuning of an LDR-2-HDR autoconversion which e.g. isolates bright regions and non-linearly boosts them, e.g. for an old Laurel and Hardy movie remastering), and considers his LDR-look the most important master grading of the LDR and HDR looks, which should be directly encoded without needing any color transformation, with potential color errors. E.g. a television broadcaster may choose this option, especially for real-life broadcasts (e.g. the news may not need to be in the most spectacular HDR).

This LDR-look (mode ii) encoding however has additional complexity due to the mathematical nature of the problem and coding mathematics on the one hand versus liberal artistic grading desires on the other, which makes it a daunting task to come up with a good technical framework. To be more precise, on the one hand we need functions which first grade down from a desired master HDR image, and at the receiver with these received functions (or the inverse functions of the downgrading actually) the receiver can upgrade to at least a close approximation of the original HDR image again, i.e. in the metadata function parameter data there will be parameters for functions (derived by the encoder from the functions which the grader used in the downgrading from the master HDR) which can map the sole LDR image to a sufficiently close HDR prediction Rec_HDR. But on the other hand, the LDR image should when directly rendered on a +−100 nit display, i.e. without further color transformation, look sufficiently good according to the color grader too. So there will be a balance between selection of the functions, and how they will influence the LDR and Rec_HDR looks, and that also taking into account other issues, like that IC or apparatus manufacturers would like to see a limited set of standard functions which are useful for the re-grading of looks, and content creators like those functions to quickly specify whatever looks they desire, since grading time is expensive and the timing of movie releases may be critical. In the below description we will describe a practical system for handling this mode ii variant of HDR scene encoding.

SUMMARY OF THE INVENTION

We need to have an improved encoding of HDR images, and in particular, we started with the philosophy that especially at the current moment when there are still many legacy LDR systems out there in the field, one needs some levels of compatibility. This means on the one hand that we would like to keep using existing (de)coder ICs which implement functionality like (I)DCT [=first level compatibility with image communication technologies]. But in addition there needs to be second level compatibility with displays which because of their low peak brightness need LDR images (i.e. an LDR look, not an HDR look with e.g. too dark colors in the darker parts of the image, but rather with darker colors which have been brightened up for better visibility on LDR displays) because they can only render LDR images (i.e. the correct LDR look under such a display dynamic range capability). This is because in addition to the presently deployed legacy TVs, in the further future there will be a spectrum of displays ranging from low brightness capability small portable displays like laptop or pad-computers or even mobile phones on which a consumer also desires to see some rendering of a HDR movie, up to the most advanced HDR displays, which in the future may have a peak brightness of e.g. 10000 nit, and all displays in between or around those. Then although the display may still be legacy and simple, it could be served by a high complexity new decoding and color mapping IC in e.g. a future settopbox or computer supplying the HDR content via e.g. a HDMI or other connection, that settopbox offering any combination of the options we invented and described. Note that a legacy LDR image would need to be some optimization between intra-object and inter-object contrast. We would like to see the interior textures of objects clearly, yet still also want to have in the LDR image an impression of the maybe huge HDR contrasty look of the original scene. I.e. the difference between a region of high and low brightness may not be renderable perfectly with the LDR image, yet there should still be a remnant of this, making the illumination changes in the scene still as optimal as possible conveyable in LDR by the human grader.

We have converted these requirements into an approach in which one would in the ideal scenario need (at least) two gradings for the same movie or pictures from the content provider, which we will simply call an LDR image (to be used for LDR display scenarios, e.g. with displays with peak brightness around 100 nit) and an HDR image (for the brighter displays, e.g. a reference display of 5000 nit peak brightness).

So for several practical example scenarios we have as starting point for the novel HDR encoding embodiments as input a master HDR graded image (let's say it's graded at will according to whatever the creator's taste was with whatever color processing software, and e.g. encoded in a starting color encoding like OpenEXR, and it may even be an upgrading to a HDR look of an image which was originally captured as LDR, e.g. by adding computer graphics effects). We then need to encode this master HDR (M_HDR) in a way which is practically usable for current video or image coding technologies (i.e. only minorly modified from the normal way to use such coding technologies which may involve a redefinition of the code meanings i.e. the respective luminances encoded by various luma codes, but not that e.g. all busses need to be changed to 12 bit, i.e. our methods should work with 12 bit hardware, but also if only 10 bit per component is available, or if one accepts some lower quality even on 8 bit systems), for e.g. a new BD-disk player, or television IC receiving internet streamed video, or any receiver connected to whatever image source largely compliant to a variant of current image/video encoding technologies.

We have come to the important understanding that a HDR image can be encoded as a LDR look image (i.e. an image which with little or no colorimetric processing—maybe a conversion to another color space, but not any or much tone mapping to convert the brightnesses of the image objects to be more suitable for a display with another luminance dynamic range—can be directly used for good quality display on an LDR display) if only one adds the parameters of the color mapping functions which can convert that LDR look into an HDR look image (our mode ii). The reader should contemplate that this is not a trivial thing to do, even theoretically, certainly not a priori, but even after having set the technical task (because it would without the correct further development seem somewhat contradictory to encode one look via another look which is supposed to be different). In particular, since many of our embodiments start from an existing M_HDR, the functions can map the encoded LDR look pixellized image into a close reconstruction Rec_HDR of the M_HDR. But of course this can generically not be just done in any particular ad hoc manner, i.e. a specific technical encoding chain is needed.

Our invention can be realized e.g. in at least the following ways: A method of encoding a high dynamic range image (M_HDR), comprising the steps of:

converting the high dynamic range image to an image of lower luminance dynamic range (LDR_o) by applying: a) normalization of the high dynamic range image to a scale of the luma axis being [0,1] yielding a normalized high dynamic range image with normalized colors having normalized luminances (Yn_HDR), b) calculating a gamma function on the normalized luminances yielding gamma-converted luminances (xg), c) applying a first tone mapping which boosts those gamma-converted luminances of pixels of the normalized high dynamic range image which lie below 0.1 with a predetermined amount lying between 1.5 and 5.0, yielding lumas (v), and d) applying an arbitrary monotonically increasing tone mapping function mapping the lumas resulting from performing the steps b and c to output lumas (Yn_LDR) of the lower dynamic range image (LDR_o); and outputting in an image signal (S_im) a codification of the pixel colors of the lower luminance dynamic range image (LDR_o), and outputting in the image signal (S_im) values encoding the function shapes of the above color conversions b to d as metadata, or values for their inverse functions, which metadata allows a receiver to reconstruct a reconstructed high dynamic range image (Rec_HDR) from the lower luminance dynamic range image (LDR_o).

This special combination of luma conversion functions has proven to be a very good way to handle encoding HDR images in the mode ii mindset, i.e. in particular in the dual way of encoding HDR images as LDR look images derived by these conversion functions from a master HDR, which LDR images serve the dual purpose of faithfully encoding the HDR look as well as being well-usable LDR look images.

Note that any codification of the pixel colors, i.e. representing the colors of the pixels in some color space coding system can be used, and some will be more pragmatic than others. E.g. the LDR_o could be outputted as an (R'G'B') image [wherein the dashes indicate some non-linear mapping of linear RGB components]. We elucidate with an example being able to encode the LDR image to be communicated to a receiver in a Yu'v' manner, and then also the processing like the tone mapping may be performed in an Yxy representation with xy chromaticity coordinates like e.g. then u'v', but the same below invention principles can also be embodied in other color representations, e.g. linear RGB representations (i.e. the calculations are then done with RGB components directly rather than Y components), etc.

Also, the skilled person will understand which of several manners one can use to co-encode the parameters characterizing the functional mappings (which can be e.g. a multilinear function defined by its change-of-segment points), which will typically be as metadata in or associatable with the image signal S_im (e.g. a SEI message structure or similar), which means that at the time a receiver needs the parameters to make sense of the encoded pixel color data for transforming them to e.g. a linear RGB output image for rendering on a connected display, it must have obtained those look defining parameters by some data communication technology, e.g. a connectable memory location via some communication link.

This particular combination of a "sensitivity" mapping which brightens at least the most dark object colors in an image (in a subrange of darkest pixel colors, which one can in practice define to be the 10% lowest luminances of a normalized linear image, which may be e.g. a Y channel, or the corresponding lowest linear RGB values) and a gamma/power function works well to handle the colorimetric characteristics of HDR images, and in particular their typical mismatch with LDR rendering. One could of course envisage many LDR renderings, e.g. the trivial one which just ignores all colors which are considered too bright or dark by clipping, but that is not necessarily the best LDR look, and certainly not usable for good quality HDR look reconstruction.

As both an HDR image (directly in mode i) and an LDR image (in particular an LDR image which is actually encoding an HDR image) can be actually encoded in a similar e.g. 3×10 bit HEVC container, one might ask which is the difference then between a HDR and LDR image. This difference is a colorimetric difference, which is very important when a display, viewing environment and viewer are involved. Mathematically one can measure it from the typical pixel values in the normalized image (i.e. a normalized LDR or HDR image), and in particular the histogram. If it is a regular LDR image, typically there will not be such a high contrast between the darkest and the brightest pixel colors. Of course, also in an LDR images there may be values which are white, as well as values which are black (zero), but these will correspond to different actual to be rendered luminances, because there is a different code allocation function defining them. Our novel receivers/decoders will recognize the situation and apply in each case the appropriate decoding. When we say the LDR image should be directly usable on a legacy display, we mean that the receiver supplying decoded images to the receiver will understand/decode the luma values with a legacy code allocation function, i.e. typically the gamma 2.2 of Rec. 709. Now a master_HDR (mode i) image may be encoded by a totally different code allocation function, which means that a black luma of say 0.05 corresponds to a much darker black than for an LDR image, and 0.96 corresponds to a much brighter color. In addition to that mode ii introduces a further new concept, that the luma codes may be now related to the HDR to be rendered lumas by yet another code allocation, and which may even be variable depending on choices by the grader (in particular the custom curve)! In particular, a mode i image will typically have not a relatively uniform (well-lit) histogram as in legacy LDR encoding, but typically a bimodal histogram, in which there are a number of darker objects, and a number of much brighter pixels (e.g. the outside pixels which would be 100× brighter in a linear luminance representation, but may be e.g. $3x$ brighter when using a particular code allocation function, i.e. in the ultimately used luma representation). In some HDR images the brighter pixels may also be few in number, e.g. a couple of lamps in a night scene. In a mode ii image, the relation will again be different. There will still be some sufficient difference between the bright and dark regions (assuming in the simple elucidation here that the HDR images is so formed), not only because then relatively simple functions can map to the Rec_HDR, but also because even the LDR direct rendering one may desire to retain somewhat of the contrast look. But on the other hand the two luminance ranges may have been shrunk towards or into each other to a certain extent because of the limitations of the LDR gamut. But what is important in all this is that one can still see some signature of whether an image was of a LDR or HDR scene. Not only mathematical image analysis algorithms can analyze the dynamic range look as encoded in images (e.g. for real-time television production in which the ultimate quality of the looks is less important than e.g. production costs), for which an image analysis unit 177 can be used. But in general our coding technologies in their most high quality format will be used with a human color grader at the creation end, who can see on typically a HDR and LDR display how the system behaves (i.e. what the LDR and HDR looks actually look like), turn the dials of his grading keyboard, and ultimately encode an LDR image and HDR reconstruction functions he is happy with. Note that typically receivers need not do a full analysis of the situation. They need not per se care about whether the normalized image they received was a HDR image or an LDR image, and which LDR image variant. They just need to "blindly" apply the functions they receive. The only thing they need to typically know is what the functions define and/or what the sole image defines. So typically the signal will contain an indicator (IND) what type of signal it is. Of course there may be communicated many things about the signal, e.g. for televisions which want to do their own smart further image improvement, but typically what a receiver needs to know minimally is that this HDR encoding signal S_im is of the type which contains an image directly usable for LDR rendering (whether its look can be finetuned into a better LDR image by receivers which can tone map the received LDR image LDR_t with further tone mapping functions [parameterized with Ff1, Ff2, etc.] or not). With this information the receiver knows that if a connected LDR display is to be served with the appropriate images, the LDR look images can be directly sent to it, and if it is a HDR display, first the color transformations will be applied to obtain the correct HDR images for rendering. The skilled reader will understand that this can be indicated in several ways, e.g. with a keyword like "DIRECTLDR", or with a set of numbers "100/5000", which indicate that the sole image is an image intended for a 100 nit display (actual or reference display) and was derived from and is mappable to a 5000 nit HDR image (not meaning that not other images for displays of other peak brightness can be derived from the LDR image with the information in the parameters defining the color transformation functions), etc.

If we now look a little more in detail to what a HDR image may typically be (when normalized and to be graded to an optimal mode ii LDR image), one should understand how various scenes will typically be master graded in a HDR reference display defined environment with a peak brightness of e.g. 5000 or 10000 nit.

Again taking the elucidating example of an indoors scene with a bright sunny outdoors, one may want to grade the outdoor colors in the M_HDR to approximately HDR middle grey, so about 20% of 5000 nit, i.e. +−1000 nit. The indoor colors should not be rendered with actual typical indoors luminances, since we are watching the movie in another environment, e.g. a typical dim environment of television viewing. So definitely the indoor colors should not be rendered at $\frac{1}{100}^{th}$ of the sunny outdoors pixel luminances, since those are also not rendered exactly, only an exact copy at any receiving side of what the reference master grading on the reference display would have been. We need to take appearance to the adapted average viewer into account, in particular that in the HDR look the indoors should not look unrealistically dark. We can grade those colors at e.g. $\frac{1}{10}^{th}$ the average luminance of the "sunny outside" image region colors, so around +−100 nit. However, now naively mapping those lumas onto an 100 nit LDR reference display (with a color mapping which is say close to a linear stretch at least conceptually), the sunny outside colors in LDR would look perfect, around about 20 nit and upwards to white, but the inside colors would be rendered around 2 nit, which would be seen as psychovisual blacks. This is why one needs to do "some" optimization, which might be quite complex depending on the complexity of a particular HDR scene, which is why preferably have a human color grader involved at the content creation side, for the aspects of our encoding framework. To make those indoors colors also reasonably viewable, we may put them somewhat darker than middle grey (18%), but not to much in the optimization. So we may want to boost those darker colors with a factor typically between 5 and 7 (depending on what is in the dark respectively bright subregions of course, the optimization may be different for a dark basement in which one should barely see tools on the wall and may clip the light of the lamp illuminating it), keeping the brighter colors above that. FIG. 5 shows two example scenarios of our HDR/LDR encoding chain. Curve 501 and 502 show only typical first ("sensitivity") tone mapping curves, i.e. before the gamma. They are defined by $$v = \frac{\log(1 + (RHO - 1) * xg)}{\log(RHO)},$$

with possible normalized values for the input xg between zero and 1.0, and an optimal RHO value in case the master HDR was defined with a reference display peak brightness of 1000 nit for curve 501 (meaning that whatever content was in the captured scene, the object luminances in the M_HDR are defined between zero and maximally 1000 nit, the value to which e.g. a welding spark or the sun may be graded), and 5000 nit for curve 502. The optimal RHO value can be determined in many ways as the skilled reader will understand. E.g. the grader may chose it, appropriate for what he considers a good LDR look given the specific M_HDR image. Or, an apparatus at the creation side may automatically calculate it e.g. according to the following equation:

$$RHO = \text{power}\left(33, \left(\frac{\log\left(1 + (33 - 1) * \text{power}\left(\left(\frac{PB_{HDR}}{10000}\right), \frac{1}{GAM}\right)\right)}{\log(33)}\right)\right).$$

In this equation $PB_{HDR}$ is the peak brightness of the reference display associated with the M_HDR grading (i.e. which defines the range of possible values, and typically corresponds to the PB of a real display on which the grader studied and created his master HDR look), e.g. 1000 or 5000 nit as in FIG. 5, and GAM is a gamma value, which may typically be e.g. 2.4. Of course the apparatus (or grader) may deviate from these values by any other algorithm or heuristic, e.g. in case a somewhat brighter, or flatter, look is required, etc.

Now one can see in FIG. 5 that if one determines the boost factors (compared to the diagonal, the normalized HDR luma being on the x-axis, and the normalized LDR luma on the y-axis) for the first/sensitivity tone mapping part only to a value between +−1.5 and 4.0, one gets after applying the gamma mapping with a gamma of 2.4 also, boost factors of around 6-7 for the darkest 10% of colors (curves 503 resp. 504 being the combined mapping of log and gamma), which is roughly what one needs (the grader can later fine-tune as desired with his arbitrary tone mapping curve, but this is a good strategy for e.g. autoconversion apparatuses, which minimally involve the grader only in case fine-tuning is needed or desirable). In general one would like to generically have a boost of +−4-8 for the combined log/gamma tone mapping operations (i.e. unit 602 and 603), which would mean that a boost value between 1.5 and 5.0 would be appropriate for the RHO-based sensitivity part only (unit 603). Any tone mapping function for unit 603 having such a behavior for the darker colors would satisfy what we need for our invention, but the above log-based equation is a simple pragmatic manner to realize this. The behaviour for the lighter colors above will typically be a gentle compression, i.e. with a function shape which typically non-linearly maps the lighter luminances above the range taken up by the boosted darker colors. Now one can have very complex HDR images, which might desire other values, but such extreme situations can be handled by an appropriate arbitrary curve definition by the grader (or an automatically grading algorithm). Note that at the decoding side, the chain of processing needs to be substantially invertible, to be able to calculate Rec_HDR from the sole communicated LDR image(s). Substantially invertible means that we do not necessarily have to obtain exactly the same color component values in Rec_HDR as in the original M_HDR, but the color differences should be within a tolerance limit. Therefor the receiver should ultimately be able to obtain the needed color transformation functions for upgrading to the HDR look Rec_HDR, whether he calculates them by inverting the downgrading functions originally used at the receiver side when making the LDR_o (or LDR_i) form M_HDR and receiving the shape information of those functions, or by directly receiving the inverse functions needed for doing the upgrading to Rec_HDR. This will inter alia typically mean that for the arbitrary tone mapping function which the grader can define to fine-tune the LDR look to his strict preferences, he will need to define a monotonically increasing function relating the normalized LDR and HDR lumas as the skilled person will understand.

The basic mode ii technical chain may work in a simple manner. E.g. for some less critical scenes, the grader may fill the arbitrary function with default values being an identity transform. Note also that although we describe the basic technical components necessary in the chain, in practical realizations one or more of these blocks may be grouped in actual units performing the functions. E.g. in some applications it may be desirable to send a total LUT of all color mapping functions together, while in other applications it may be advantageous to send the separate functions, because the television (automatically, e.g. after analysis of the scene, or under user interface control by the viewer) may e.g. want to further tune e.g. the first function which brightens the image somewhat compared to the sensitivity or RHO value received via the image/video communication technology.

More advanced versions may use some further processing steps, e.g. the method of encoding may determine a gain value (gai) for mapping the maximum luma of the lower dynamic range image (LDR_o) to a specific value of the possible values in the reconstructed high dynamic range image (Rec_HDR), and encoding that gain value in the image signal (S_im), which should not be confused with the final scaling form normalized colors to the peak brightness of the connected display (e.g. Lm=5000 nit). This gain allows more versatile grading and/or coding.

A very useful improved method of encoding a high dynamic range image (M_HDR) comprises: after applying any of the above color mappings to determine the lower dynamic range image (LDR_o), applying a further technical tone mapping (301) to determine a second lower dynamic range image (LDR_i) which can be used to drive LDR displays as an alternative driving image alternative to the lower luminance dynamic range image (LDR_o), which technical tone mapping is determined by: a) determining a first geometrical region of the lower luminance dynamic range image (LDR_o) for which the visibility of banding in the corresponding reconstructed high dynamic range image (Rec_HDR) is above an acceptable level, b) determine a range of lumas (L_u) for that region, c) determine a second range of pixel lumas (L_uu) adjacent on the luma axis to the range of lumas (L_u), wherein the second range is identified to fulfill the conditions that it has a number of lumas above a minimum number (MIN), and corresponds to a second geometrical image region which contains a texture which can be represented using less than the minimum number of codes in an LDR image (LDR_i) upon which to apply the functions yielding a reconstructed high dynamic range image (Rec_HDR) of sufficient visual quality for that second region, and d) determining a redistribution mapping function which redistributes the lumas of the first and second range of lumas, so that additional codes are available for the first range, and outputting in the image signal (S_im) values encoding the function shape of the redistribution mapping function or preferably its inverse.

One is somewhat limited in the trade-off between full or sufficiently precise reconstruction of the Rec_HDR, and the look of the LDR image LDR_o, in particular if hardware (and grading cost) dictates that a relatively limited amount of grading functions should be used. Some HDR scenes may not be so difficult (e.g. the average viewer may not be too critical about whether the shadows of a shadow side of a sunlit street are a little darker, or a little more light grey, as long as the deviations from the optimal look are not too excessive), but some HDR scenes can be more critical (e.g. somewhere on the HDR luminance range there may be a guy partially hidden in luminous mist, and if the local contrast there is too high he may only be somewhat too visible, but if the contrast is too low, he may be invisible, changing the story). It would be advantageous to have another dimension of grading possible, at least for receivers which are not legacy (and don't know how to do any HDR processing), and can do some further tone mapping. A legacy display could then get the "best effort" LDR image, which will be the sole image transmitted, but smart future receivers could do some smart technical tricks to further optimize the LDR look, so that it comes closer to what the grader desires (maybe even clip some values in the ultimate LDR look, which would be incongruent with HDR reconstruction if that happened in the sole transmitted LDR image). Having such a possibility, some encoding methods or encoders could cater for this. Squeezing a very complex very high contrast ratio HDR image in an LDR sole image (e.g. an HDR image which have several important regions with many grey values, e.g. a dark unlit room an relatively well-lit second room, and at the same time a colorful sunlit outside, and with these 3 regions also containing important gradients covering many grey values, e.g. of a white table under the lamp in the well-lit room), it could happen that one or more regions become unacceptable, because due to the limited word length (e.g. 10 bit) for the color components, somewhere (depending on the shapes of the color mapping functions) there is banding which is judged too severe. This region can be identified, e.g. by the grader spotting it (and he may be aided by being pointed to potentially critical areas by HDR image analysis software in the grading apparatus). Banding detectors can calculate e.g. that for an extended region (potentially also taking into account which luminances this region has, and estimated JNDs) there are jumps of each time a number of successively equal colors, and they can define an acceptable level based on the values from such a calculation (and typical in factory experiments). The grading apparatus after having found such a region (e.g. by finer segmenting what the grader has roughly selected), can then roughly determine the range L_u of luminances corresponding to it. E.g. there may be banding in a blue sky, the colors of which have luminances between L_sky_low and L_sky_high. The problem would be mitigated, if the LDR encoding had more values to encode the image in, where we should understand that at the encoding side the M_HDR and any transformations may still be of very high precision. But these codes don't exist: we only have the 10 bits available for all needed luminances, and we also need to sufficiently encode all other image regions of different illumination. But a trick can be used, if some codes can be borrowed from regions of the image which have luminances adjacent to L_u, especially if the visual quality of those regions degrades little by taking a few codes from their code range (which typically the grader will judge, by a simple operation of accepting the result, or disagreeing in which case another attempt will be tried, which is more aggressive in case the banding is still to high for the original banded area and the adjacent region can still be deteriorated more, or a little less aggressive if the grader indicates that the adjacent region starts deteriorating too much). A simple manner to redistribute codes is e.g. a linear or non-linear modification of the local function part. Now the issue with the sole transmitted image LDR_o, is that the sky may e.g. have become a little too dark, and maybe too contrasty by this operation (and also the adjacent regions may be somewhat too dark, and their texture look may have changed etc.). This may be not too problematic in case of small changes and less critical scenes, and a little more inconvenient for difficult scenes. It is the price legacy systems may have to pay because they can do absolutely nothing with any of the received data except for directly rendering the LDR_o, but new receivers can apply the inverse of the transformations used to redistribute the lumas, to create an LDR look very close to the originally intended one (i.e. with the appropriate sky luminances etc.), but now with less banding. A receiver need not do much smart analysis, it only needs to see that such a technical tone mapping function is available, and apply it to the reconstruction of the sole transmitted LDR image LDR_t to obtain the better LDR look image LDR_ul. A number of methods may also be applied in the grading apparatuses to come to good suggestions for the adjacent region, e.g. a region with a sufficient amount of lumas (e.g. equal to the amount in the sky) and with some complex texture may be determined. Simple embodiments may e.g. use all codes below the range of the banded regions, up to the blackest black.

The amount of additional codes for the first range is determined based on a banding visibility criterion for the first geometrical region. An automatic algorithm may come with a proposition, e.g. 20% additional codes, and typically the human grader will acknowledge this. The algorithm may also highlight the regions it had to deteriorate, e.g. by blinking a coloring of those regions, so that the grader can quickly check whether those are of sufficient visual quality also in the reconstructed HDR Rec_HDR.

In most practical embodiments, the identification of the first geometrical region showing the excessive banding is typically ultimately performed by a human grader via a user interface unit (105), e.g. by scribbling a wavy line along the banded region, and the amount of banding of the first geometrical region in the reconstructed high dynamic range image (Rec_HDR), and the visual quality of reconstruction of the second geometrical region in the reconstructed high dynamic range image (Rec_HDR) are judged by the human grader as acceptable or unacceptable, wherein in case of the acceptable judgement the values encoding the function shape of the redistribution mapping function or its inverse are encoded in the image signal, or in case of the inacceptable judgement the steps are done again with different parameters to come to an alternative redistribution mapping function. E.g. 10% more codes may be allocated to the banded region, perhaps at the expense of an enlarged adjacent luma range L_uu.

An interesting embodiment of the method of encoding a high dynamic range image (M_HDR) has the pixel colors of the lower luminance dynamic range image (LDR_o) are encoded as a luma channel and u' and v' color coordinates which are calculated as $$u' = \frac{4X}{X + 15Y + 3Z}, \text{ and } v' = \frac{9Y}{X + 15Y + 3Z},$$

with X, Y and Z being the device independent 1931 CIE color coordinates which are derivable for any RGB representation (i.e. the and CIE 1976 (u',v') chromaticity representation). Normally according to the legacy philosophy, images (especially LDR images) would be encoded as YCrCb images. But if one changes any codec (e.g. for internet transmission), one might as well encode the color components as Yuv component planes, which has some advantages both in image quality of the transmitted images, and ease of applying the various color transformations of our system (of course the legacy televisions will not then be able to make good looking pictures out of this).

We have found a generically chosen luma definition (defined by the chosen full tone mapping strategy of the above steps, ultimately obtaining lumas in LDR_o or LDR_i) which together with two luma-independent chromaticity coordinates, in particular the u',v' coordinates standardized by the CIE, will be a good codification to be used in standard image or video compression technologies. Compression technologies similar to e.g. HEVC will typically apply at least spatial compression by doing DCTs of blocks of samples, but for video they may also do motion estimation based compression, etc.

In simple embodiments the encoding of the functional color transformation behavior of the color conversions can be communicated with only a few simple parameters by storing in the metadata associated or associatable with the sole image(s): a) a sensitivity value (e.g. RHO, or an equivalent parameter defining RHO called SENS and defined here below, or any function or correlate of RHO allowing to determine a RHO value), b) a gamma value (GAM), and c) a number of values characterizing the functional shape of the arbitrary function mapping the lumas.

A method of encoding a high dynamic range image (M_HDR) comprising determining a gain value for mapping the maximum luma of the lower dynamic range image (LDR_o) to a specific value of the possible values in the reconstructed high dynamic range image (Rec_HDR), and encoding that gain value in the image signal (S_im). This is useful for a further scaling of the Rec_HDR image obtainable from the LDR image, e.g. if the LDR image of a relatively dark shot is represented relatively brightly, i.e. which lumas up to a relatively high value in the range of possible LDR lumas, yet the HDR image should be rendered not too brightly, which is handled best by already decoding it with a not too high maximum luma.

A method of encoding a high dynamic range image (M_HDR) comprising determining a saturation modification strategy either of the colors of the high dynamic range image (M_HDR) to colors in the lower dynamic range image (LDR_o), or the other way around, and coding this saturation modification strategy as parametric values in metadata in the signal (S_im). Typically graders will also want to affect the saturation of an image, e.g. they may change the saturation of the LDR_o obtained from M_HDR with some saturation mapping strategy, and/or the saturation of Rec_HDR from LDR_o (e.g. first a tone mapping leaving the u,v chromaticities of the obtained Rec_HDR colors at the values they had in LDR_o, and then changing the saturations of those Rec_HDR colors).

Some embodiments of the method of encoding a high dynamic range image (M_HDR) comprise: after applying any of the above color mappings to determine the lower dynamic range image (LDR_o), applying a further technical tone mapping (301) to determine a second lower dynamic range image with redistributed lumas, i.e. lumas of typically slightly changed values for at least a geometrical region and luma subrange of the image (i.e. a redistributed luma low dynamic range image LDR_i), which guarantees that at least in the to the grader more important regions of the second lower dynamic range image (LDR_i), e.g. which are carefully watched by the typical intended viewer, because they are e.g. large and bright, and prone to banding, sufficient luma codes can be allocated to encode the textures in those regions with sufficient precision to enable reconstructing the reconstructed high dynamic range image (Rec_HDR) with errors below a predetermined error criterion (a minimal banding amount).

It is important for some embodiments that one doesn't choose any weird tone mapping strategy. In particular, if one wants to be able to obtain a good quality Rec_HDR, i.e. close in mathematic pixel color values to M_HDR, then one needs to assure that there are no undersampled textures in LDR_i, which happens if one assures that the final mapping before uniform quantization is nowhere too flat.

Typically this may be done by luma counting strategies on the LDR picture and/or luma counting strategies such as e.g. a banding detector on the HDR image, or any such predetermined HDR reconstruction error criterion. In some embodiments the criterion may be performed by a human grader. Its presence can be seen by having a technical remapping strategy co-encoded in S_im, to be applied by the smarter future generation receivers.

The method may be embodied in an image encoder (100) arranged to encode a high dynamic range image (M_HDR), comprising:

A dynamic range conversion unit (104) arranged to convert the high dynamic range image to an image of lower luminance dynamic range (LDR_o), the dynamic range conversion unit (104) comprising connected in processing order: a) a normalizer (601) arranged to normalize the high dynamic range image to a luma axis ranging over [0,1] and to output normalized luminances (Yn_HDR), b) a gamma conversion unit (602) arranged to apply a gamma function to the normalized luminances and to output gamma-converted luminances (xg), c) a first tone mapping unit (603) arranged to apply a first tone mapping which boosts those gamma-converted luminances which lie below 0.1 with a predetermined amount lying between 1.5 and 5.0, yielding lumas (v), d) an arbitrary tone mapping unit (604) arranged to d) apply an arbitrary function which maps the lumas (v) to output lumas (Yn_LDR) of the lower dynamic range image (LDR_o); and the image encoder (100) further comprising:

an image compressor (108) arranged to apply a data reduction transformation to the colors of the lower dynamic range image (LDR_o) which colors are organized in component images, and which reduction transformation involves at least applying a DCT transform to blocks of adjacent color component values, yielding a compressed codification (LDR_c) of the pixel colors of the lower luminance dynamic range image; and a formatter (110) arranged to output in an image signal (S_im) the compressed codification (LDR_c), and arranged to in addition output in the image signal (S_im) values encoding the function shape of the color conversions as metadata, or values for their inverse functions, which metadata allows a receiver to reconstruct a high dynamic range image (Rec_HDR) based upon the lower luminance dynamic range image (LDR_o).

A pragmatic embodiment of such an encoder is one in which the gamma conversion unit (602) uses a gamma value equal to 1/(2.4), and/or the first tone mapping unit (603) uses a tone mapping defined by the equation $$v = \frac{\log(1 + (RHO - 1) * xg)}{\log(RHO)},$$

with RHO having a predetermined value, which value typically is a function of the peak brightness of the intended serviced display and/or the reference display associated with the master HDR encoding M_HDR.

An image encoder (100) arranged to specify a gain allowing mapping the maximum of the luma codes in the lower dynamic range image (LDR_o) to a chosen luma value of the reconstructed high dynamic range image (Rec_HDR), and having the formatter (110) arranged to output this gain as a value in metadata in the image signal (S_im).

An image encoder (100) as claimed in any of the above encoder claims comprising a technical tone mapping unit (106), arranged to automatically or human-guided determine texture and statistics information of the lower dynamic range image (LDR_o), and in particular at least one critical geometrical region which is prone to reconstruction errors in particular banding in the Rec_HDR, and on the basis thereof calculate a second tone mapping (Ff1, Ff2, . . . ) for being applied as a transformation to the lower dynamic range image (LDR_o) to yield a second lower dynamic range image (LDR_i) having a minimal number of luma codes (e.g. 1.3*L_u) characterizing the textures of at least some important, error-prone regions of the second lower dynamic range image (LDR_i), thereby allowing reconstructing the reconstructed high dynamic range image (Rec_HDR) with errors below a predetermined error criterion. To enable communicating the necessary information allowing after encoding a receiver to mirror-wise implement our mode ii system, it is useful to transmit (or store for later transmission) a high dynamic range image signal (S_im) comprising:

A pixellized lower dynamic range image (LDR_o) with encoded pixel colors; and further:
   a sensitivity value (RHO); and
   a gamma value (GAM); and
   a gain value (GAI); and
   a set of values specifying an arbitrary tone mapping function shape (P_CC).

From these values the receiver can then determine the function shapes of all functions to be applied to the sole communicated LDR image (LDR_o, or LDR_i), should any image of higher dynamic range than the 100 nit LDR image be required and calculated.

In particular the S_im may also comprise values 207 codifying a technical remapping strategy (Ff1, Ff2, . . . ) for mapping between an artistic LDR grading as desired by the human creator/grader of the content, and a technical LDR which when sampled has sufficient lumas for all regions of the image for good Rec_HDR reconstruction, or at least those regions determined as more critical by an automatic image analysis unit and or a human.

In particular it is useful, because very pragmatic for receivers to quickly determine which of the now several (very) different possible HDR image encoding mechanisms is used, in particular by comprising in the image signal S_im an indicator (IND) specifying that an image of high dynamic range has been encoded in it, and with a method which encodes this as an image of low dynamic range, which is directly usable, without a need for further tone mapping, for rendering on a LDR display. Various such ways of encoding can be devised and agreed, as long as any receiver understands it.

A memory product such as a blu-ray disk storing any embodiment of our high dynamic range image signal (S_im).

To have an image communication chain, on the receiving end one may have various realizations of apparatuses being or comprising an image decoder (150) arranged to receive a high dynamic range image signal (S_im) and comprising:

a deformatter (151) arranged to obtain a compressed pixellized lower dynamic range image (LDR_c) and parameter data (P) out of the image signal (S_im); and a decompressor (152) arranged to apply at least an inverse DCT transform to the compressed pixellized lower dynamic range image (LDR_c) to obtain a pixellized lower dynamic range image (LDR_t); and a dynamic range conversion unit (153) arranged to transform the lower dynamic range image (LDR_t) into a reconstructed high dynamic range image (Rec_HDR), wherein the dynamic range conversion unit (153) comprises in processing order: a) an arbitrary tone mapping unit (402) arranged to apply an arbitrary tone mapping, the parameters which define it (P_CC) being received in the parameter data (P), b) a first tone mapping unit (403) arranged to apply a mapping as defined by at least one received parameter (RHO) defining the first tone mapping which was previously determined by any of our encoder or encoding method embodiments, and c) a gamma conversion unit (404) arranged to apply a gamma mapping with a received gamma value (GAM).

This decoder will first undo all the typical legacy e.g. HEVC or similar compression codifications, and then apply the various mappings in reverse order (note that not everything need in all embodiments be exactly in the reverse order; e.g. in Yu'v' one may chose to do orthogonal luma and saturation processing in a reverse order, be it maybe with slightly different mathematical functions, as long as the final result is exactly or approximately the intended color). Note also that there may be additional processing steps, which may only exist at the receiving end (e.g. an image may be encoded in some RGB representation like Rec. 2020, but may need to be converted to another format as understood by a television, e.g. DCI-P3, and further converted to the actual primaries of the TV).

So the image decoder (150) will comprising a dynamic range conversion unit (153) arranged to transform the lower dynamic range image (LDR_t) into a reconstructed high dynamic range image (Rec_HDR), and there may typically be logic units and further color processing functions defining at least when to do what (e.g. depending on which display or displays are currently connected and served).

A pragmatic embodiment of the image decoder has the first tone mapping unit (403) arranged to apply a function of the form:

$$xg = \frac{(\text{power}(RHO, v) - 1)}{(RHO - 1)},$$

in which v is a pixel luma, and RHO is a real-valued or integer parameter received in the parameter data (P).

A useful embodiment of the image decoder (150) comprises a tone remapping unit (159) arranged to apply a further tone mapping (Ff1, Ff2, ...) received in the image signal (S_im) to the lower dynamic range image (LDR_t) to obtain a second lower dynamic range image (LDR_ul) which reverses a code redistribution action, applied by any of the encoder methods 5 to 7 yielding a second low dynamic range image (LDR_i) with redistributed lumas for obtaining a reduced banding in at least a region of the reconstructed high dynamic range image (Rec_HDR). In fact the encoder need not necessarily know exactly how any encoder came to a particular transformation function redistributing the lumas, it just needs to apply the inverse functions to come to substantially the intended LDR look (LDR_ul).

Another useful embodiment of the decoder can understand Yu'v' encodings of the LDR image, and thereto comprises a color transformation unit (155) arranged to convert an Yu'v' color representation in a RGB color representation. Tone mapping can be done before the conversion is done, therefore leaving the conversion to RGB to the last part of the processing chain, or alternatively, the conversion can be done first, and an equivalent color processing can be done on RGB signals.

Corresponding to any of the decoders correspond methods of decoding a high dynamic range image signal (S_im) comprising obtaining a reconstructed high dynamic range image (Rec_HDR) by applying the color conversions encoded in the parameter data (P) to the lower dynamic range image (LDR_t), in particular a method of decoding a high dynamic range image signal (S_im) comprising:

obtaining a compressed pixellized lower dynamic range image (LDR_c) and parameter data (P) out of the image signal (S_im); decompressing the compressed pixellized lower dynamic range image (LDR_c) by applying at least an inverse DCT transform to the compressed pixellized lower dynamic range image (LDR_c) to obtain a pixellized lower dynamic range image (LDR_t); and transforming the lower dynamic range image (LDR_t) into a reconstructed high dynamic range image (Rec_HDR), by: a) applying an arbitrary tone mapping, the parameters which define it (P_CC) being received in the parameter data (P), b) applying a mapping as defined by at least one received parameter (RHO) defining the first tone mapping which was previously determined by any of our encoder or encoding method embodiments, and c) applying a gamma mapping with a received gamma value (GAM), which is preferably equal to 2.4. We describe a system which allows the grader to simply yet powerfully optimize the look of an LDR look on a HDR image of a HDR scene. Preferably as little visual quality sacrifice is done as possible, but since LDR may need some optimization due to its dynamic range limitations, the system allows the grader to fine-tune micro-contrasts of particular to him interesting scene objects, i.e. typically important characteristic objects in this scene, and thereby if some brightness-quality sacrificing needs to be done, sacrifice the precise look of some less important objects like a wall in the background, rather than the main object in the scene. The invention can be realized in many other (partial) ways like with intermediates containing the core technical requirements of the various embodiments like the defining parameters embodied in signals, and many applications of it may result, like various ways to communicate, use, color transform, etc. the various possible signals, and various ways to incorporate the various hardware components, or use the various methods, in consumer or professional systems. Any component can of course be realized in or as a small component, or vice versa as a key core of a large apparatus or system which predominantly functions because of this component.

BRIEF DESCRIPTION OF THE DRAWINGS

These and other aspects of the method and apparatus according to the invention will be apparent from and elucidated with reference to the implementations and embodiments described hereinafter, and with reference to the accompanying drawings, which serve merely as non-limiting specific illustrations exemplifying the more general concept.

FIG. 2 schematically shows an embodiment of what an HDR image signal S_im according to our invention may look like;

DETAILED DESCRIPTION OF THE DRAWINGS

Figure 1:
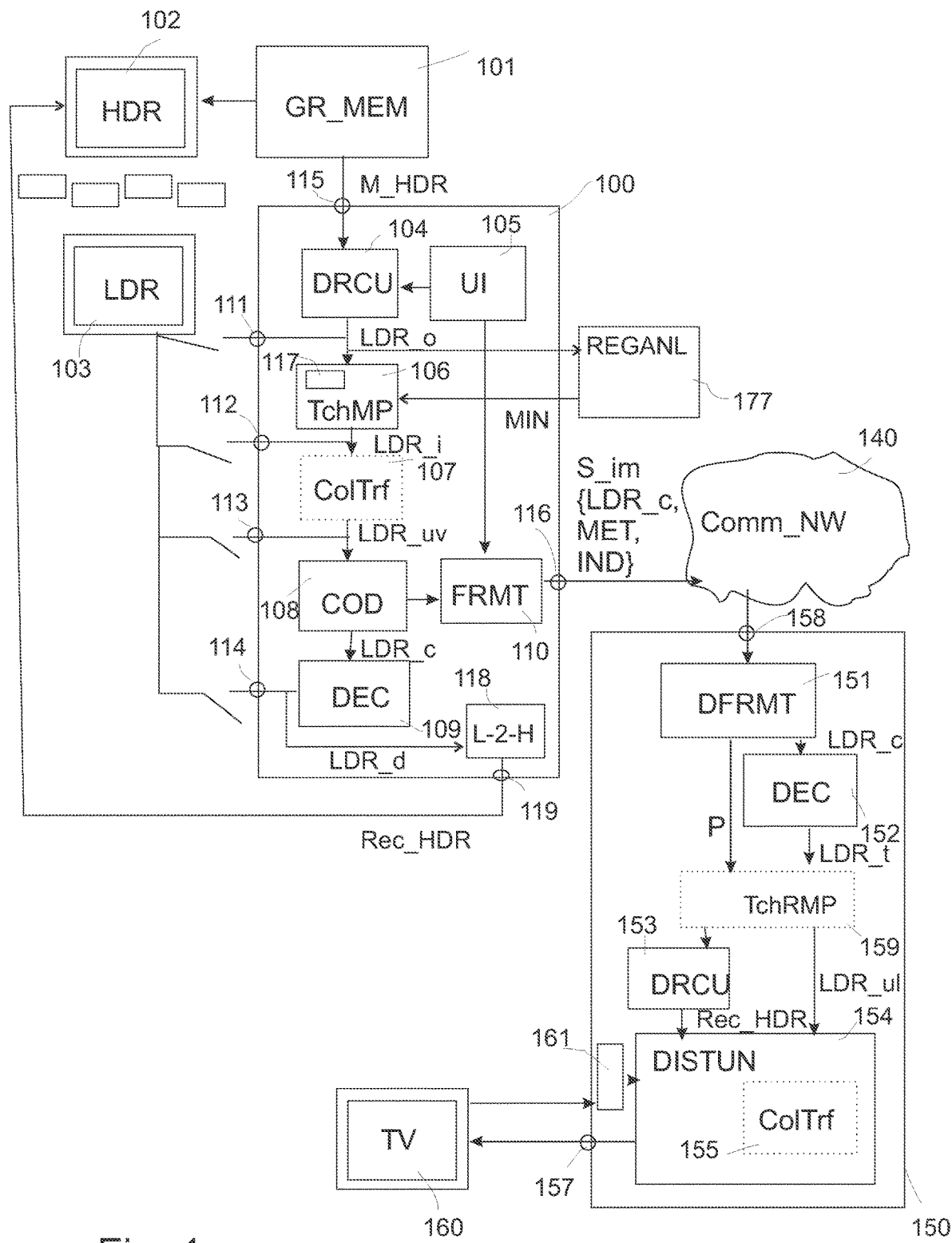
FIG. 1 schematically shows an example of an embodiment of an encoder and a decoder according to our invention in an image communication technology.

FIG. 1 describes an exemplary typical system embodying our invention, with an image (or video) encoder 100 at a creation side, and an image decoder 150. We assume there is a memory 101 in a grading system which contains a master graded HDR look image (M_HDR) which has been graded as desired by the content creator according to currently known color grading techniques for say a movie in a color grading software like e.g. Da Vinci's (similar other systems may benefit from the teachings in our present application, e.g. M_HDR may come directly from a camera, after e.g. a tuning of a camera look curve on the dials of the camera, etc.). In this M_HDR e.g. the brightness of light shining through windows may have been chosen to give a most pleasing look on the [0,5000] nit reference display by giving those pixels an intended to be rendered luminance L_out and a corresponding luma code v_HDR, and many further light effects may have been designed, as well as other color optimizations. M_HDR is inputted via image input 115 in our encoder 100, and may also be looked at on a HDR reference display 102 (which exactly the characteristics of the theoretical e.g. [0-5000] nit reference display we propose for HDR encoding). This means when the grader wants to make an LDR-look (which should not only encode the object textures sufficiently precisely so that on the receiving side a reasonably accurate reconstruction Rec_HDR of the M_HDR can be obtained, but also this LDR-look should be suitable for optimally rendering the encoded HDR scene on an LDR display), the grader can compare at the same time how much the LDR look given technical limitations looks on LDR display 103 similar to the M_HDR, and optimize by changing the color mapping functions for obtaining it from M_HDR as desired according to his liking. The two displays may be in their different optimal viewing environments and the grader may be looking at both separated by e.g. a wall (e.g. in two enclosed reference environments with their respective window opening for looking simultaneously into them, and with curtains which can be closed if the grader wants to see only one of them during some time interval). The grader may also check the reconstructed grading of the HDR look on HDR display 102 (e.g. toggle Rec_HDR and M_HDR alternatively).

By means of a user interface unit 105 which offers the grader classical controls like e.g. turning wheels or similarly sliders for setting values like a gamma or sensitivity value, the grader can make colorimetric transformations defining how the M_HDR should be mapped to the LDR look image, with the parameters of the transformations to be outputted in an image signal S_im via an output 116 of the encoder which may be connectable to any image transmission medium 140, e.g. a communication network, or a physical carrier memory like a BD or solid state memory, etc.

The LDR look is generated via a dynamic range conversion unit 104, which is arranged to apply colorimetric transformations on at least the lumas of the pixel colors, but also typically on the chromaticity coordinates. By lumas we mean any encoding which is ultimately convertible in a physical luminance, or even via psychovisual models a brightness (which is the ultimate appearance a viewer will see when the image is rendered on a display). Note that by equivalent mathematics luma transforms can be applied as corresponding transformations on RGB components directly. Although the ultimate goal is the correct object brightnesses (appearances) in the look, we can limit our technical discussion to the determination of luminances in the reference e.g. [0-5000] range, or a device independent color space like XYZ defined by this range. Furthermore we will assume that any chromatic transformations of the colors are done in the UCS plane of 1976 CIE Luv space, however the skilled person can understand how similarly other second and third color components may be used, with the basic components of our invention being generally applicable CIELuv defines u and v from XYZ (similarly one can transform from some RGB) as:

$$u = \frac{4X}{X + 15Y + 3Z} \text{ and } v = \frac{9Y}{X + 15Y + 3Z}.$$

We assume for simplicity that the HDR and LDR gamuts (i.e. the gamuts of theoretical displays associated with the encoding mathematics of the two images) have the same three (or more) R, G, B, primaries, and can hence, by scaling the respective maxima of say 5000 and 100 nit to 1.0, be collocated as exactly overlapping. So a tone mapping from HDR to LDR then becomes a relative transformation along the normalized luma direction within this single device dependent RGB gamut. E.g. if one wants to make the darker colors in the HDR look the same on an LDR and HDR display, this becomes as a relative transformation in the same gamut the following: because in a 5000 nit defined color definition such colors in the HDR image will have small codes (e.g. below 0.1) we need to brighten them to become sufficiently visible on a 100 nit LDR display, e.g. with values around 0.3. The exact mapping will depend on the definition of the lumas for both the LDR and HDR image, because as a generalization of the "gamma 2.2" definitions of legacy LDR image and video encoding, we can now define arbitrary code allocation functions mapping from physical luminances to luma codes (or the other way around, because typically tv engineers start by defining a reference display which in addition to a reference [0-5000] nit range has some reference display EOTF behavior indicating how the e.g. 1024 lumas map to renderable luminances along that reference range). Not only could we use a power 1/(7.0) gamma as OETF, but we could even use discontinuous code allocation functions if in a shot of images there are no luminances present between a lower range of luminances and an upper range of luminances. Also note that working in an Y'uv representation with luma-independent chromaticities (u,v) allows us to work totally independently and freely in the achromatic and chromatic directions of color space.

Limiting our elucidation for the skilled reader to achromatic mappings of HDR-2-LDR only, these can be formulated generically as in principle an arbitrary tone mapping function from the [0,1] lumas of the HDR-look image to the [0,1] lumas of the LDR-look image, as one can see with an example in FIG. 2a.

Specifying such a function, we will assume that the mapping on all colors (Y_M_HDR, u,v) is done so that for a non-achromatic color (u< >u_wp, v< >v_wp) where (u_wp, v_wp) are the chromaticity coordinates of a chosen white point such as D65, the determined tone mapping function 210 is linearly scaled to a maximum luminance L_max(u,v) achievable for that color, as taught in more detail in WO2014056679. The skilled reader may understand how such processing instead of being applied in a Y'uv color encoding can similarly also be done in an RGB color encoding.

Once the grader specifies such a tone mapping behavior, encoders have sufficient information for a brightness dynamic range transformation to be applied on any possible color in M_HDR, yielding an original (uncompressed, possibly still unquantized in a float representation) LDR look LDR_o. From this, any exact or approximate mathematical transformation can be determined by the encoder, which allows a receiver to do the prediction the other way around, from LDR_o to Rec_HDR. The grader can check via an image output 111 how such an image (after sufficiently formatted into an image signal which can be communicated over an image communication link such as e.g. HDMI) would look on a reference (say 100 nit, or in the future maybe 500 nit) LDR display 103.

We will however teach in the present invention that it is useful when the tone mapping is not just constructed in any generic manner, but in a particular manner, and the (few) corresponding parameters are usefully encoded as separate metadata in the image signal S_im, because they can then be advantageously used at a receiving side, e.g. during tunability to derive an optimal driving image for a particular X nit display.

As a first parameter, the grader will choose e.g. a sensitivity parameter SENS, or RHO directly. This will be a value which is intuitively similar to the ASA or ISO values known from photography, and typically determines how bright the LDR image will appear (inter alia how much the dark object colors of M_HDR are raised).

As a preferred embodiment the encoder can use a EOTF/OETF function which already provides a good initial LDR look,
which EOTF function is defined as follows:

$$L = Lm\left(\frac{\rho^v - 1}{\rho - 1}\right)^\gamma$$

This equation defines the to be rendered HDR luminances L corresponding to luma codes v in [0,1] spread equidistantly based on the amount of bits available for the luma code word of the pixel colors, as say 1024 possible values. Lm is a choosable variable indicating the peak brightness of the reference display of the M_HDR or Rec-HDR linear color/luminance representation, which may e.g. be fixed as 5000. E.g. the grader will have dials to choose the sensitivity which may typically be related to rho as:

$$\rho = \left(\frac{SENS}{8\sqrt{2}} - 1\right)^2$$

Together with the SENS (RHO) value determining the dark colors behavior and some overall brightness look, the grader can co-tune gamma (GAM) as some bending parameter reallocating object/region brightnesses along the range of possible LDR lumas. Of course when mapping from luminances L in a reference XYZ space representation of the M_HDR grading (which may be a useful intermediate representation), to v luma values of the LDR look, the grader will define the inverse function.

Doing elementary mathematical calculations on the RHO division, it can be seen that the inverse function (OETF) is: first apply a 1/(GAM) yielding $$xg = \text{power}\left(\frac{L}{LM}, 1/GAM\right),$$

and then calculate:

$$v = \frac{\log(1 + (RHO - 1) * xg)}{\log(RHO)}.$$

Typically at the encoder there may be one of various possible embodiments of an image analysis unit 177. This unit may be arranged with artificial intelligence to analyze regions in the image, and which of these regions could yield particular problems in HDR encoding, in particular of the mode ii type. In particular, it may identify regions which could be prone to banding, and regions which are sufficiently textured, so that they can be encoded with a lesser amount of luma and/or color component codes. In some applications this unit may automatically come to a final encoding proposition (e.g. a transcoder) without any human grader involvement, but in other applications it may e.g. bring regions under the attention of the grader, so that he can scrutinize them. Of course there may be an interaction with the user interface, e.g. the grader could indicate that he wants to mitigate the banding with a particular region, or with a particular texture, and then unit 177 can extract such a region, and its luma range, etc.

Figure 2:
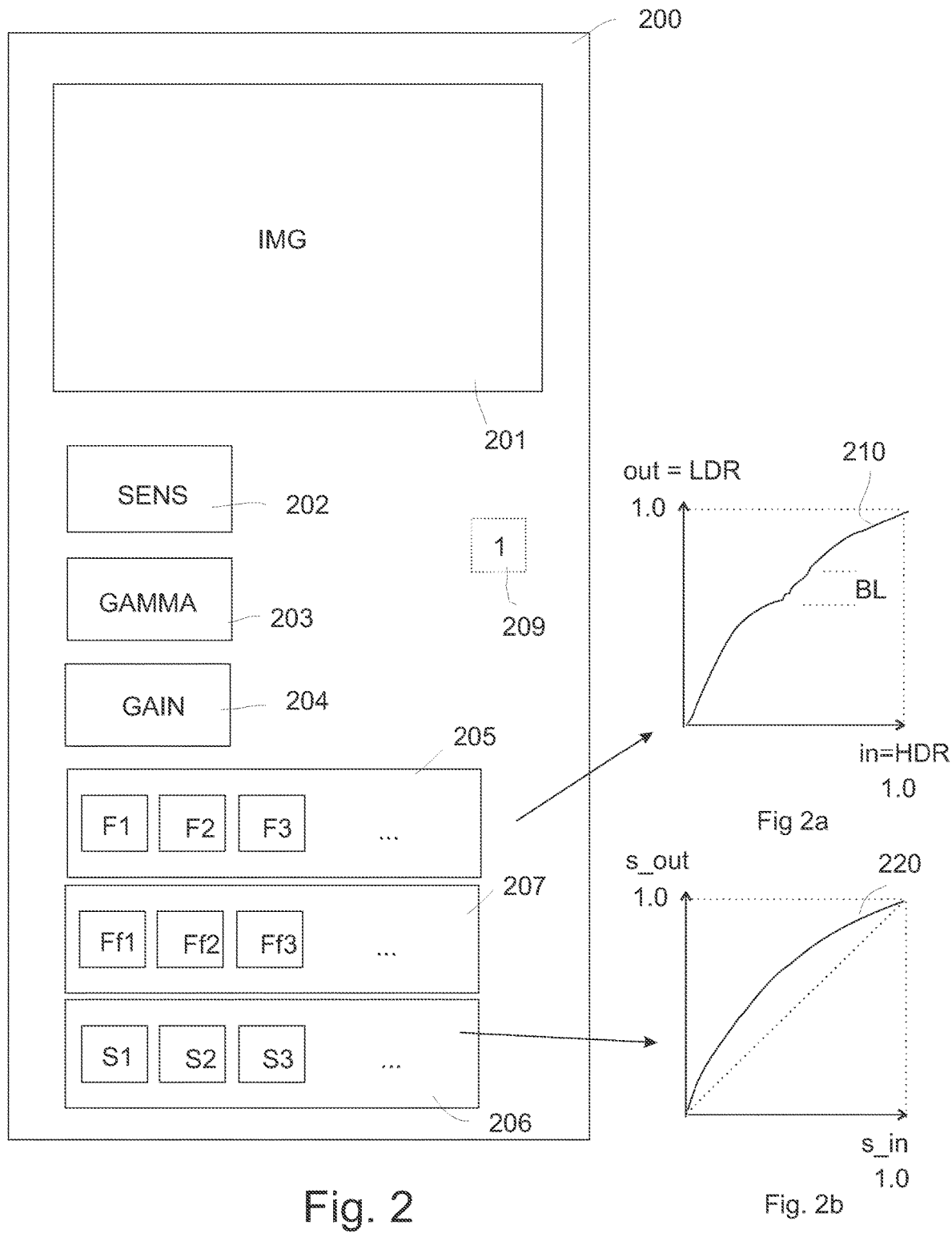

As we can see in FIG. 2, although one can decide to encode a final tone mapping function in typically a reserved LUT space in the metadata 205, typically one will encode a sensitivity parameter (e.g. 200 ISO) or a RHO value, and a gamma value (e.g. 2.8) in respectively sensitivity metadata field 202 and gamma metadata field 203. FIG. 2 schematically shows how an image or video signal S_im (200) looks, and the skilled person will of course know that can be defined in practice in the many digital variants, given existing image data containers etc. Our encoder embodiments use a classical 3 component encoding of the pixel color image (201), which will be our grader-optimized LDR look image. This LDR image LDR_o will typically be classically DCT encoded, run-length encoded, formatted etc. according to an image encoding standardized format like JPEG, or a standardized video encoding format like MPEG-HEVC, VP1, etc. The skilled reader will understand that reformatting colorimetrically to be able to reuse legacy (or similar future) coding technologies as a generic concept is part of our invention, but it is not so important which of such codings is actually used. And another part of our invention is the metadata needed to make sense of the data, e.g. at least when recovering the Rec_HDR look of the scene (because the LDR look can in theory be used directly to drive an LDR display, with no further dynamic range processing but only colorimetric redefinition mapping from Y'uv to some device dependent RGB space encoding).

Furthermore, the grader can use a GAIN value (co-encoded in a gain metadata field 204) so that the functions need not perse map 1.0 to 1.0. E.g., the gain may indicate how an LDR image which is defined over the full range [0,1] is to be mapped to only say a [0,1500] subrange of the [0,5000] range of the HDR display. The other way around limiting the LDR range used is in principle also possible, though less likely to be used. This gain can be used to make some images not too bright, as one can imagine if the scene is e.g. a misty scene, or a dark image which is reasonably brightened in LDR, but needs to stay dark in HDR.

These three parameters (RHO, GAM, GM) give already a very useful first mapping of a M_HDR image to a corresponding LDR look image, with a roughly global brightness or illumination adjustment. This may e.g. be sufficient for broadcasting real life shows, where the optimal parameters are determined right before the start of the broadcast. More critical users like movie producers, may want a more fine-tuned control over the look. They may want to specify a more general tone mapping function than the above "log gamma" one, with finely positioned bends in the curve which can raise e.g. the average local brightness or contrast of a particular object (e.g. a face) to a desired subrange of all renderable LDR luminances (or more precisely their corresponding lumas). Or a specification of a local slope can specify the desired contrast in some interesting subrange BL of an important region in the image, at the cost of brightness positions and contrasts of other regions/objects in the LDR look image.

Now an important thing to understand is that with our mode-i (HDR-look) system the grader can define such mappings arbitrary, because we only need to derive an LDR-look image (which is no reconstruction, but can be done data—destructively if so desired by the grader), because in that encoding approach we have the HDR-look image already encoded as sole image in the image signal S-im. In mode-ii systems however we need to fulfill a dual criterion: on the one hand we need to be able to reconstruct the Rec_HDR image with good quality, but on the other hand we want sufficient freedom to create most if not all LDR looks a grader may desire (and then can be quite creative at times, as one can see e.g. in the movie Sin City 2).

But one should understand that whatever grading LDR_o the grader has made with his preferred tone mapping 210, in a legacy encoding these output LDR lumas will go through classical uniform quantization (and even DCT-ing). So we should be careful not to create mappings which as too flat over some parts of their range (i.e. the local derivative delta_LDR_out/delta_HDR-in should not be too small, so that a minimum required amount of LDR luma codes is allocated to that range delta_HDR-in or the corresponding delta_LDR_out), because otherwise when boosting that range in the LDR-2-HDR tone mapping, we will see artefacts like banding or excessively contrasty and visible DCT artefacts.

We could have a control mechanism with a stiffness of the local control points which the user uses to change the shape of the arbitrary tone mapping, but that is unpleasant for the user, especially if implemented to harshly (of course the system can warn if the grader is wanting to make really strange mapping curves, e.g. inversions like an N-curve should not be made).

Figure 3:
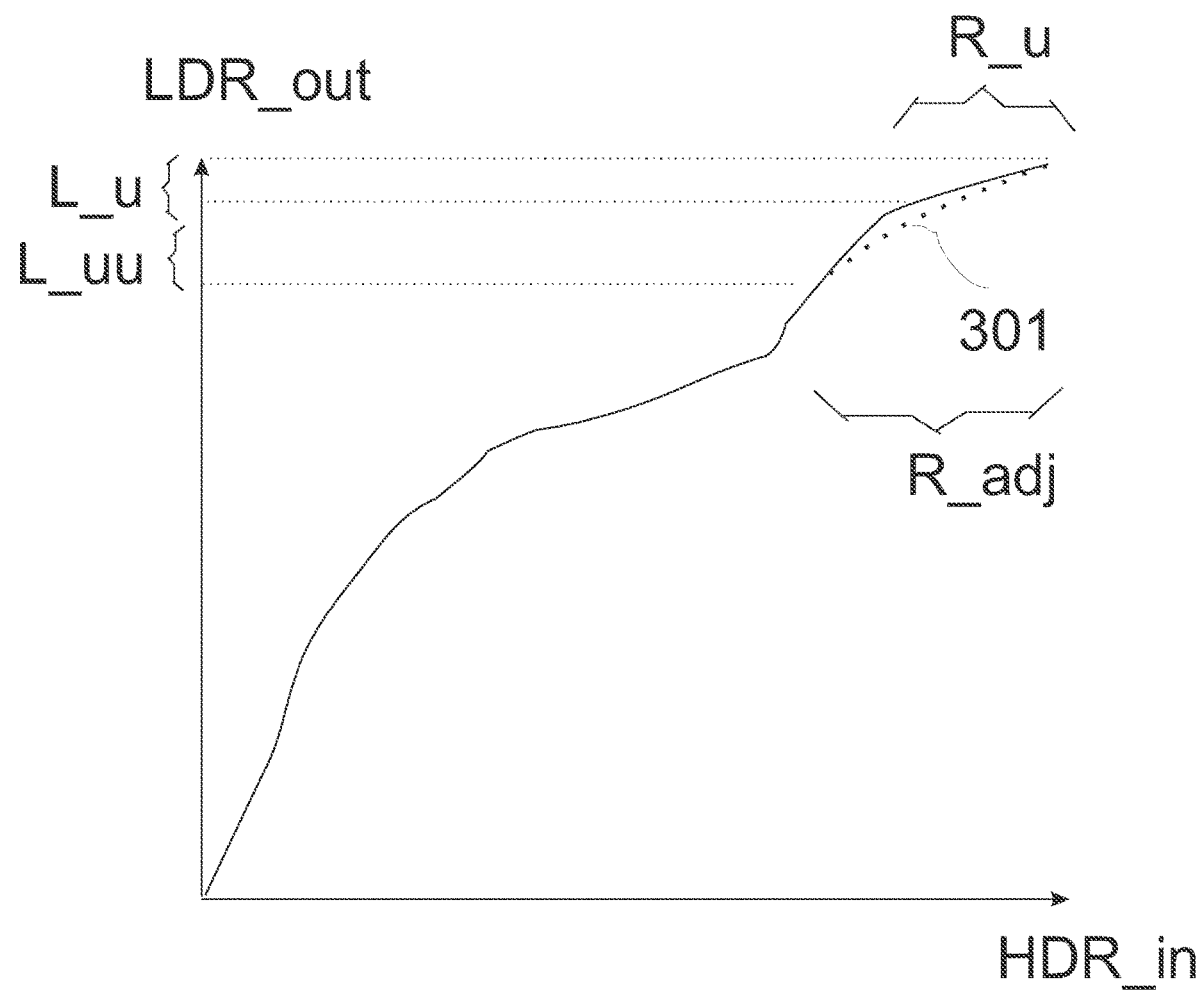
FIG. 3 schematically elucidates by one species how one can generically obtain a technical LDR grading, which could even happen under the hood automatically without bothering the grader or content creator in some embodiments, which allows better sampling of the object lumas, and therefore better quality reconstruction of Rec_HDR.

A useful embodiment is shown in FIG. 3, which elucidates the behavior of a technical tone mapping unit 106, which can be used to determine a second LDR look, alternatively usable to LDR_o by smarter receivers needing to service an LDR display. We assume the grader has chosen his desired curve which gives the appropriate LDR look, which is the solid curve in FIG. 3. If the tone mapping curve is not good, this will mean there is at least one range which is too flat, which we assume here is the part R-u of the brightest HDR an LDR pixels, let's say the sky of the scene. We need to be able to stretch that range L_u in LDR, so that somewhat more luma codes can be allocated, and in as non-destructive (little changing his look) a manner as possible for the grader.

This can be done when there is an adjacent range L_uu which contains more textured object.

This is a way out of the conundrum that our look curve for getting a desired LDR look at the same time determines the quantization or number of luma codes available for faithfully encoding the various HDR region textures (the sufficient faithful characterization of all textures being in the scene being the primary goal of encoding quality in HDR encoding). Having 1024 different luma/grey levels (and millions of codes) should be sufficient to nicely encode all textures for human vision, if well done. Complex objects can be encoded with relatively fewer codes, since the eye firstly sees the coarse texture pattern, and then not so much the precise values of the pixel colors. Only in particular unfavourable situations can we have an issue if we have brightness gradients for which we have used too few codes.

So there are two things when adapting a curve: the technical tone mapping unit 106 typically keeps the adaptation when needed sufficiently local on the luma axis, so that we don't perturb the lumas of too many object colors (e.g. avoid darkening critical dark regions too much again). A quality criterion for this example scene may be that we need to brighten the dark colors to get a good LDR look, so a local change in the bright colors won't disturb that in any way. So tone mapping unit 106 will typically redistribute the codes in some local luma subrange around the problem area, and determine a corresponding adaptation curve for this, which is the dotted line (this curve may follow somewhat the shape of the original curve, in its two image region encoding parts, i.e. if there was a parabolically bending local shape for the sky lumas, it may typically use a scaled, larger similarly bending parabolic segment for the air, but that is not absolutely needed, since only precision of coding is the criterion).

So we need to stretch the sky region brightness range somewhat, to have enough codes for faithfully encoding a Rec_HDR blue sky gradient. But how much do we need to do that, and how far should we extend the adjustment range R_Adj?

That depends on a number of things. Of course R_adj should cover the region where there is a problem, which will typically be a relatively visually simple region, such as a relatively uniform regions such as a gradient in the sky (this blue gradient will exist somewhere along the LDR luma range). On the other hand we must need an adjacent region which is sufficiently textured. In the unlikely situation that the adjacent region is yet another smooth gradient (which could occur in synthetic images like artificial gradient test images, in which case we will have to be satisfied with whatever optimal luma allocation we can get, but this does not typically occur in natural images), R_adj may become relatively big. In the normal situation where we soon encounter a textured range we can extend L_u with a range L_uu of a size which depends on how many codes we have to add, and the complexity of the texture pattern. If we need to add only 3 codes to the sky, we need to save 3 luma codes in L_uu, and if sufficiently textured we could do that over a range of ay 10-15 lumas, depending on what the grader or viewer finds/may find acceptable.

The apparatus can contain tables for that.

So the nasty problem with look-curve-dependent-luma-codification is now largely solved. On the one hand we don't darken the adjacent darker objects too severely, since we only shift the colors of L_uu a little on the upper range by expanding our sky range L_u, but mostly we keep the lower part of L_uu the same, only sampled a little less, which is not a visually conspicuous issue anyway, because textures don't need so many codes anyway. The stretched range of sky may be a little suboptimal, but should normally not really be an issue, and we get an improved quality Rec_HDR in return. But all this is still only if we don't take any counteraction at the receiving end, e.g. by a receiver which can't do any processing. Because in the decoder we can do a precompensation strategy in tone remapping unit 159. This will then make the luma allocation a purely technical matter outside of the concerns of the artistic intents of the grader. Because tone remapping unit 159 will apply the correction for the local stretch into a compression again, before using the resulting intended LDR look (LDR_ul), for e.g. driving an LDR display. So in the example of the sky, where we stretched the sky lower limit of L_u down into the brightnesses of objects in adjacent range L_uu (thereby darkening those objects), tone remapping unit 159 of a decoder 150 will apply the inverse mapping of 301 as a correction. This means that visually the sky range will have its original luma range L_u again, and when rendered on an LDR display the correct luminance range, yet it has more precision because was allocated more texture encoding luma codes. Similarly in the LDR_ul look the object with adjacent brightnesses in L_uu will also have the correct non-dimmed brightnesses, and only differ in precision because of the reduced amount of codes. And the skilled person can understand how this technique can always in the various other possible situations improve the coding precision in those regions of an image where needed, whilst keeping the intended LDR look LDR_ul of the grader. The only thing tone remapping unit 159 needs to be able to do is to apply a tone mapping strategy to the decoded technical LDR_t, e.g. by means of a LUT, which may be co-encoded in the signal S_im (or partly encoded if the tone mapping can be derived from e.g. a limited set of control points, e.g. delimiting linear segments), and hence it should be clear why it is advantageous to encode this technical adjustment function separately (Ff1, Ff2, . . . ) in S_im, because it can be used by the decoder even to come to a more desirable LDR look LDR_ul, once it had been determined at the creation side and accepted by the grader, and communicated to a receiving side.

There will largely be two categories of encoder embodiments which will enable the above. The first one largely does all processing automatically, and need not involve the user. Smoothness and texture detectors will automatically categorize the various regions, and so identify the gradient pattern in the sky and the adjacently located (i.e. on the luma range located below and/or above L_u) other textured objects. Various texture characterizers may be built-in to determine the complexity of the texture (e.g. fine-grainedness, amount of intertwined grey values etc.), and determine therefrom how visually conspicuous perturbations leading to less encoding lumas will be, and the therefrom resulting needed L_uu range. As said, these preferences may be pre-built in formulae determining the L_uu functionally, or with LUTs. Also in some embodiments DCT or other compression emulators may be present, e.g. which calculate the resulting decompressed LDR images LDR_d under various choices for R_adj and the functional tone mapping perturbation shape 301, and calculate a severity measure for the typical visibility (at normal viewing range, display size, surround brightness, etc.) of the banding and/or other compression artifacts. Texture analysis unit 117 may be present for this, which is typically arranged to analyse textures, and in particular their visual impact, in both the original (LDR_o) and the encoded LDR_c, or in fact the decoding thereof. LDR_d which will ultimately be present at the receiving end. In particular remappings to HDR by LDR-2-HDR color mapping unit 118 may be used to allow the grader to check visual impact if needed. If the grader wants to check the reconstuctability of this M_HDR as Rec_HDR, he can e.g. toggle them in time on his HDR display 102, via HDR image output 119. In fact, the decoder may have several outputs (which we have shown separate, but of course they can be routed internally to just one output) 111, 112, 113, 114 to be able to check the various versions of LDR.

A second category of encoders with technical re-grading may directly involve the human grader. If he is checking the quality of the automatic algorithms already, he may have an option to influence the results (i.e. typically semi-automatically). This should be simple for the grader, as he may want to be more involved with the artistic determination of the look, i.e. the placement of the object lumas, rather than technical issues like compression artefacts (if already wanting to look at that, and although he will check one or more typical and approved scenarios, down the image communication line there may of course be further compressions which could have more severe artifacts).

In these encoder embodiments the user interface unit 105 will typically allow the grader to specify geometrical image areas which according to him are particularly problematic areas. E.g. he may scribble through the sky, and the histogram analysis and texture analysis units will then focus on this part of the image when doing their analysis and technical update partial tone mapping curve determination. E.g. they may successively propose a strategy which adds some more luma codes at a time to the sky, until the grader is satisfied. E.g. an embodiment algorithm of the tone mapping unit 106 may multiply this range of the gradient (banding-sensitive) object by k=e.g. 1.5, and select a neighbour range of a textured image region and compress that to L_uu-1.5*L_u. I.e. any linear or curvi-linear redistribution of the codes in the two regions can be used. The L_uu may be selected to be at least e.g. 3*L_u, which values are typically optimized by an apparatus designer on the basis of a set of representative images. If the proposition by the apparatus is good, the grader accepts it, making the encoder store the corresponding parameters in S_im, or otherwise a new iteration is started, e.g. with k=1.1*1.5.

The perturbation 301 will lead to a final tone mapping, with which corresponds a final technical grading LDR_i, which will be the LDR look which is send into the communication system after further formatting according to our mode-ii HDR encoding system, and which largely corresponds to what the grader desires as LDR look. The advantage of grader involvement is that he can indicate—at least with a minimum of involvement—which regions are semantically more relevant. The statistical texture analyser may determine that few lumas (i.e. few pixels) actually exist in a region between e.g. the dark lumas of a room indoors, and the bright lumas of the sunny outdoors, and hence decide to apply a remapping strategy which applies few codes there (in case the decoder remapper 159 can arbitrarily reconstruct the desired LDR look, we might even use a strong technical deformation curve which almost cuts the entire scarcely used subrange out of the LDR_i encoding thereby making immediately adjacent in LDR_i luma value the indoors and outside subranges). However, if in this small region there happens to be an important object like somebody's face or an object which was emphasized somehow like an appearing object, the grader may counteract this. Several practical embodiments are possible, e.g. he may scribble in our draw a rectangle around this region, and then turn a dial which increases the amount of luma codes to be used for that region. The skilled reader will understand there are various other user interface ways to select a critical region or object in the image or shot, and to indicate how it should be encoded with lumas, even up to the grader drawing or influencing the shape of the modification curve 301 itself.

The rest of our mode-ii system is as follows:

Optionally the dynamic range conversion unit may do some color saturation processing (e.g. since colorfulness decreases with darkening and vice versa, the grader may want to compensate the saturation which has become somewhat inappropriate because of the luma tone mapping). A good practical exemplary embodiment works with a general saturation function of the non-information destructive type.

By this we mean that also this saturation function is nowhere too flat, so it can also be reversed. But in some embodiments the saturation function may only need to be applied in the LDR-2-HDR upgrading, and then it may be more liberal. In FIG. 3 we have shown a smooth saturation from s_in to s_out, which can be encoded with a number of values S1, S2, S3 in a LUT in the signal S_im. These may be the s_out values for equidistant s_in values (a sufficient amount to that the desired curve can be reasonably smoothly recovered at the decoder), but this could also be e.g. function shape control points. A desaturation function may e.g. be encoded as a line with slope smaller than 45 degrees (on a plot of s_in vs. s_out). In such a desaturation case, the image signal could just have an integer or float value for the multiplier in the metadata. We assumed in the elucidating example that s_out will be the saturation of the HDR image, and we need to boost the saturation of the now darkened darker colors of the scene to increase colorfulness, but the skilled person can understand there may be different processing variants in the same structural encoding philosophy. We will for simplicity of elucidation assume that the saturation is performed in uv space, e.g. irrespective of the luma we may perform the operation s_out=s_in+MS(s_in)*s_in. The MS(s_in) is then the multiplicative value retrievable from the function as seen in FIG. 2b and encoded in LUT 206, which stretches the saturation vector in a hue direction compared to some white point. We assume for simplicity we have defined our uv space in a cylindrical one with the maximum saturation on the periphery (and coded as 1.0). Of course the skilled person will understand that we can both encode our saturation strategy in another colorimetric definition, or given that the definition is e.g. in cylindrical Y'uv space, the designer of the decoder hardware or software can choose to actually perform it equivalently in another color space, such as the RGB-based YCrCb space, etc. The grader can also determine and encode in S_im luma-dependent saturation strategies, i.e. functions changing the saturation, which multiplicator varies with the luminance of the processed color. Basically, a more advanced embodiment of S_im will have a saturation encoding structure. This may be e.g. a web-based definition which has for a number of key hues (e.g. the 6: RGBCYM) a multiplier function defined over luma: MS(Y'). From this which can be encoded as 6 LUTs of values similar to 206, at the receiving end the decoder can determine a saturation strategy for all colors in the gamut by interpolation. A more complex strategy may even introduce variability of the saturation in the radial direction. This can be easily encoder by determining these functions (similar to what one sees in FIG. 2b, but now variable over the luma height in the gamut) simply parametrically, e.g. as offset, gamma, gain functions. In this case one would have: s_out=s_in+F(s_in, Y') for the key hues, and in case of e.g. a three-parameter function shape control, one may encode this in S_im either as 3×6 LUTs specifying the luma behavior of e.g. the saturation_gamma parameter as varying over Y', or 6 LUTs for the hues, but where not a single multiplicative value is encoded at each position, but a triplet [sat_offset(Y'_i), sat_gain(Y'_i), sat_gamma(Y'_i)]_LUT_of_yellow, consecutively over a number of positions i sampling the possible lumas in the gamut.

Now in some embodiments of an encoder (and corresponding decoder) there is an optional transformation to u'v' for the color characteristics of the pixels, which we will now elucidate (but other embodiments may alternatively or additionally encode in e.g. R'G'B' or YCrCb, etc. directly, and not even have the optional unit 107 inside; note also that some Yu'v' processing can be mathematically re-written as equivalent linear RGB processing).

Having applied to dynamic range transformation to create the right LDR look (e.g. in RGB space, or XYZ etc.), assuming we didn't already do the mapping in Y'uv space, color transformation unit 107 of the exemplary elucidation embodiment will do the conversion to our u'v' representation, with the lumas Y' in that color representation being determined by our total tone mapping function (i.e. the lumas of intermediate LDR image LDR_i), and u, v as per the above equations. We could also do colorimetric transformations in unit 107, which condition the colors already when a different device dependent RGB or multiprimary space is envisioned. E.g. if our M_HDR was encoded with a smaller RGB triangle, but the LDR is for a wide gamut display, the grader may already predefine a saturation boosting strategy, although things will often be the other way around, in which case unit 107 may implement a chromatic gamut mapping.

Finally the resulting LDR_uv is encoded with a classical LDR image or video compressor 108, i.e. typically DCT or wavelet transformed etc.

This compressed image LDR_c is send to a formatter 116, which adds the metadata on the applied mapping function according to a standardized format, for it to be suitably available at a receiving side. I.e. this formatter adds the sensitivity value (RHO or alternatively SENS), the further tone mapping for finetuning the LDR look as determined typically by the human grader (although in the further future some encoders may be smart enough to do some fine-tuning themselves) with function defining parameters 205 typically as a LUT of values (F1, F2, . . . ), the saturation encoding 206, e.g. also a set of parameters defining a multi-linear function, etc.

The further tone mapping for technical reasons is typically stored separately in the image or video signal S_im, preferably as a set of integer or real values 207, which may be used to store e.g. a 256-point or 1024 point LUT.

The coded LDR_c can be decoded again to LDR_d, and then upgraded by color mapping unit 118 so that the grader can see via image output 119 what the reconstructed HDR Rec_HDR would look like at a receiving end. If he so desires he could even test the influence of some typical compression settings up to e.g. strong compression. The herein described decoder could also be used in a re-coding strategy, where the grading look may already have been prepared previously, but now e.g. a low quality highly compressed LDR version is redetermined for some particular image/video communication application. That secondary grader may even re-tune the parameters. Depending on whether he has the original M_HDR available he may e.g. redetermine the downgrading functions to achieve a new more appropriately adjusted LDR look (e.g. serving mobile phone viewers), and in fact he may even do that when only having the good Rec_HDR available instead of M_HDR. The split of a technical grading part to more appropriately allocate the luma codes is very useful for such scenarios. Because the functions mapping to LDR_o (and the corresponding close reconstruction LDR_ul thereof) determine the actual artistic LDR look, and they may have been determined once and for all by the primary grader at or around the time of initial production of the content. But the encoder can still automatically or semi-automatically with involvement of the secondary grader determine the technical mapping with the small modifications like 301, and the corresponding LDR_i (or LDR_t), and the coded metadata Ff1, Ff2, in set of real or integer values 207 in S_im, which may of course be different for different technological limitations, such as the amount of bits (e.g. only 8 bits for the luma channel).

The decoder 150 may be an IC in, e.g. such as in this elucidation, a settopbox or computer connectable to a display 160 or television (so when we say decoder we intend to cover both any small realization of this such as a "settopbox on a USB stick" or any large apparatus realizing and benefiting from our invention such as a settopbox with hard disk and optical disk reading facilities, and encoder can be anything from a small device to a large grading system, etc.), but of course the television may not be a dumb monitor but comprise all this decoding technology in its own IC. The display 160 may be both an LDR display or a HDR display, or basically any display connected via any image communication technology via image output 157, such as e.g. wireless streaming to a portable multimedia device or a professional cinema projector.

The decoder gets our formatted S_im via image input 158, and a deformatter 151 will then split it in an image LDR_c (IMG in FIG. 2) for decompressing by a classical JPEG-like or MPEG-like decompressor 152, and the parameters P from metadata (e.g. a sensitivity setting 1000, and some values which can be used to reconstruct a tone mapping or saturation mapping functional shape). Optionally in the decoder is the tone remapping unit 159, because since this technical remapping is usually not a severe deformation of the grader-intended LDR look LDR_ul, some decoders can afford to ignore it. Fully HDR compliant decoders should however use this unit 159 to apply a technical re-correction strategy as codified in the Ff values of 207, to arrive at the correct LDR look LDR_ul (which is a close approximation of LDR_o). This corrected LDR image (LDR_ul) goes to a further display color tuning unit 154. This unit 154 can apply the needed optimization for a particular say 1300 nit wide gamut display (tunability). Although variants are possible, we have drawn a typical decoder for our HDR encoding philosophy, which has an image processing path for recovering LDR_ul (or if 159 is not present its approximation LDR_t), but also has a second image processing path to determine the Rec_HDR. This is done in dynamic range conversion unit 153, which typically applies the inverse mappings applied at the encoder (actually in the signal one will typically encode the parameters of this inverse mapping, i.e. an upgrading). The display color tuning unit 154 will typically be arranged to combine the information in the two gradings, which could be done based on using only one image and the color mapping parameters P, but we assume in this elucidated embodiment that it gets a Rec_HDR and LDR_ul image as input and then interpolates those, according to which display with which peak brightness is connected and to be supplied with the appropriately graded images.

Apart from tone mapping to obtain the correct brightness look, a color transformation unit 155 may typically be comprised arranged to do chromatic adaptations to optimize for a different color gamut than the encoding gamut (e.g. Rec. 2020 to DCI-P3 or Rec. 709, etc.).

What will be output via image output 157, and hence calculated by unit 154 will of course depend on the connected display. If it is an LDR display, unit 154 may send e.g. LDR_ul, after of course correct color remapping (by unit 155) from Y'uv to a particular device dependent R'G'B' encoding e.g. If the display 160 connected is close to a 5000 nit peak brightness display (see also on how the decoding apparatus can ask a t.v. its capabilities in WO 2013/046096; a controller 161 can do such communication with the display and even with the viewer to obtain his preferences, and may be arranged configure how the display tuning unit 154 should behave and which kind of image look it should calculate and output) the Rec_HDR look image may be output, again after suitable formatting according to what the television wants to receive (i.e. this can still be an Y'uv encoding, e.g. our S_im format with now an HDR look image stored in 201/IMG, and some functional metadata may also be transmitted so that the television can do some last look colorimetric finetuning based on the information on how gradings change over the spectrum of rendering possibilities as encoded in this metadata, or it can already be an R'G'B' HDR display driving image). For intermediate peak brightness displays, unit 154 may output a suitable driving image, again either in our Y'uv format, or another format.

Finally, the content creator may prescribe in the signal whether he desires that the compensation mapping of unit 159 should not be skipped, e.g. because the content creator thinks that LDR_t seriously deviates from LDR_ul. This can be done by encoding a Boolean 209 in an IGNORE_TECHNICAL_MAPPING field of the metadata.

It should be clear to the reader that where we have elucidated only the minimum of one set of parameters, of course along the same rationale several sets of color mapping functional metadata can be encoded in S_im, e.g. one set for going from the sole image IMG (being an LDR image) to a reference e.g. [0-5000] nit HDR look image, and a second set can be added for going to e.g. a 1500 nit MDR look. And although doing a specific decomposition of a sensitivity, gamma, gain, and further finetuning function shape is advantageous, and at least good for technical elucidation, any one of the mappings, e.g. the mapping LDR-2-MDR might be encoded in S_im in a condensed form, e.g. by only filling the tone mapping LUT or set of values 205, which codify the final mapping function (i.e. everything of sensitivity, finetuning, and technical mapping together).

Figure 4:
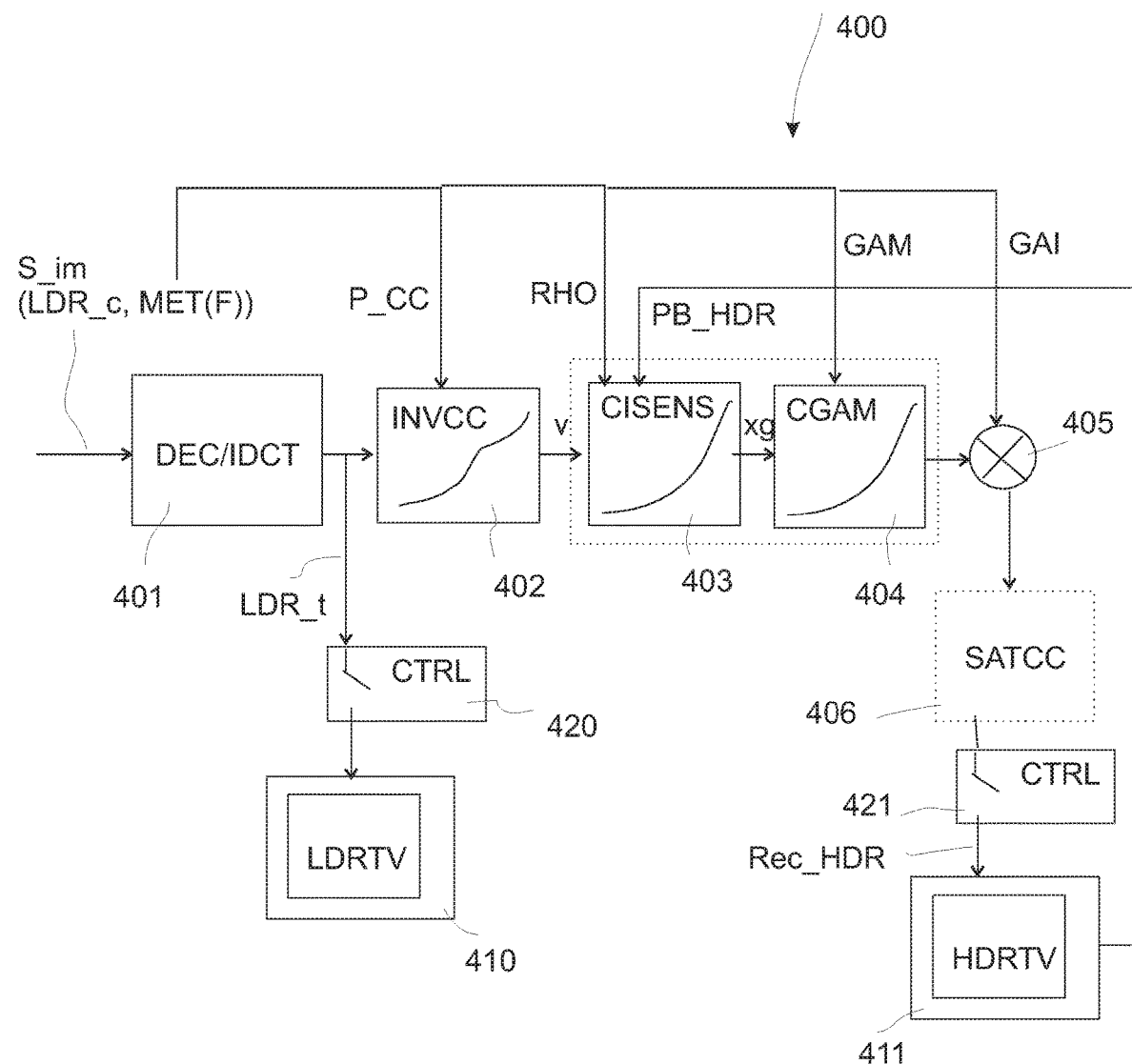
FIG. 4 is a simple schematical elucidation of a possible decoder according to our invention.
Figure 5:
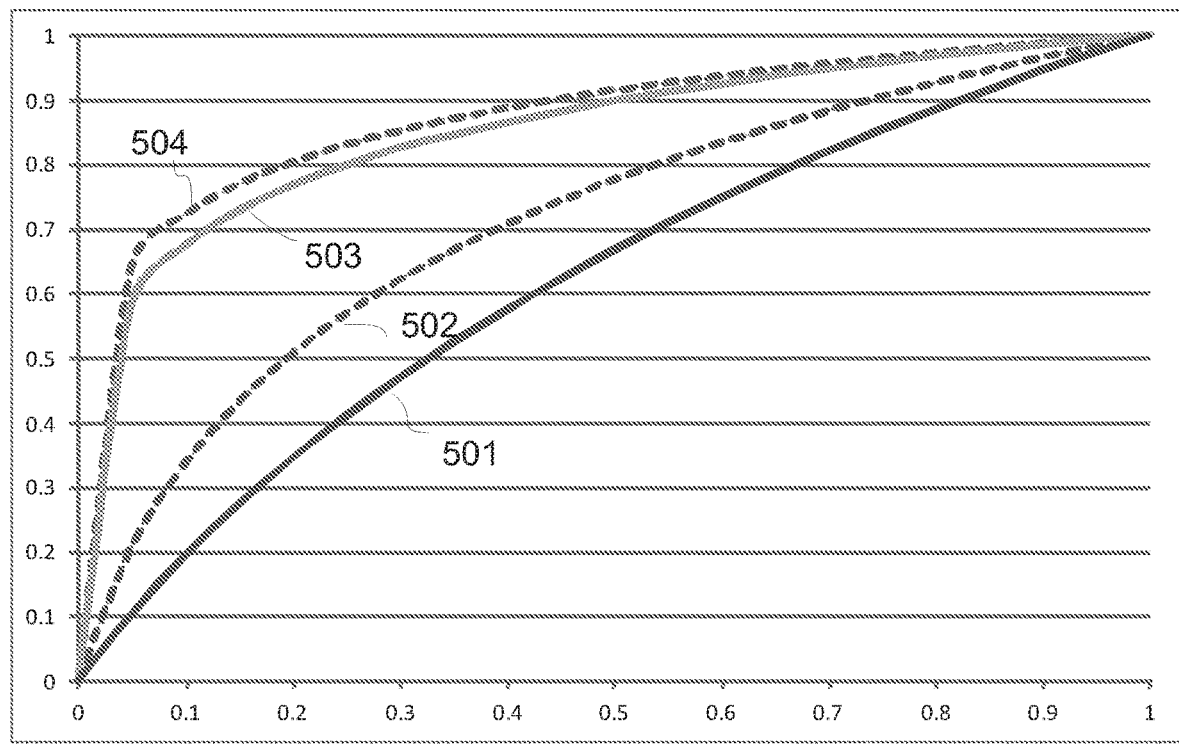
FIG. 5 shows two x two possible embodiment curves for doing the sensitivity mapping which significantly brightens the colors, or the combined initial LDR grading, with in addition the gamma behavior.

FIG. 4 schematically shows a typical embodiment of our decoder core unit 400 (in this example the minimal part of mode ii, without technical regrading, or Yu'v' conversion, etc.). After a decompressor 401 doing the run length or arithmetic decoding, and inverse DCT etc., we get an image LDR_t, which we will assume to be in gamma 2.2. representation (i.e. with lumas or R'G'B' components defined according to Rec. 709) and normalized. There may be a first control unit 420, which can directly send this image to a connected LDR TV 410 (directly meaning there may of course be some legacy formatting involved; in principle LDR_t could also be e.g. a linear image, in which case their will be a need to re-gamma-2.2 map it before sending it to the LDR display, but it may be advantageous if that is not needed; the further tone mapping functions will typically be different depending on what type LDR_t is, which may also be indicated with an indicator IND_2 in S_im). Then a first tone mapping unit 402 does the inverse mapping of the arbitrary tone mapping, the defining parameters of that function shape P_CC being received in the metadata MET (F). Then a second tone mapping unit 403 does a tone mapping re-darkening the darker colors relatively to the brighter ones, by e.g. applying the rho-equation above, with a received RHO value. The unit could also calculate the RHO value from a received display peak brightness PB_HDR, received from the connected HDR display 411. Then a third tone mapping unit 404 performs a gamma power function with a received GAM value being e.g. 2.4 preferably. Then a multiplier 405 may do a multiplication with GAI, which by default may be 1.0. Optionally a color saturation processor 406 may do some saturation processing.

Finally control unit 421 may send the image to the HDR display 411, and it may do some further processing, e.g. to correctly format the image according to a standard which the display understands, e.g. over a HDMI connection.

Figure 6:
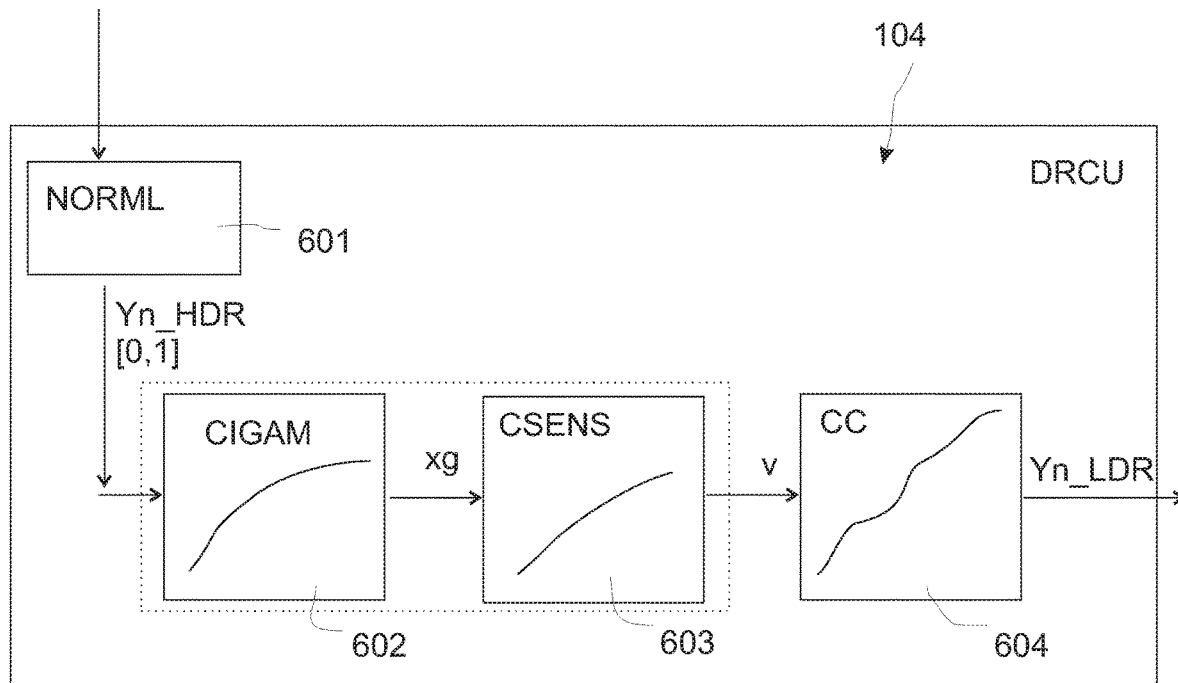
FIG. 6 is a simple schematical elucidation of a possible dynamic range conversion unit of an encoder.

FIG. 6 shows a simple encoder dynamic range conversion unit embodiment. It comprises a normalization unit 601 for normalizing all color components to 1 (i.e. if e.g. R, G, and B are normalized to 1.0, so will the maximum luminance be normalized to 1.0, and vice versa). The normalized luminances Yn_HDR of HDR image pixels (or in equivalent embodiments e.g. the normalized linear RGB components) go to a first tone mapper 602 doing a gamma operation, with a gamma as desired by the grader (or automatic grading unit), but usually fixed to 1/(2.4). Then a second tone mapper 603 does the transformation which appropriately brightens the HDR dark colors, e.g. with $$v = \frac{\log(1 + (RHO - 1) * xg)}{\log(RHO)},$$

with an appropriate RHO factor proposed by the grading system depending on the dynamic range difference between (the peak brightness of) M_HDR and the typically 100 nit LDR, and typically ultimately accepted by the grader, who may or may not change this initially proposed RHO value. Then by using third tone mapper 604 the grader starts fine-tuning looking at various objects in the image, and ultimately defines a custom tone mapping curve CC, by changing various lumas of those various according to the grader important image objects. This yields the lumas Yn_LDR of the LDR_o image, with all data ready to be encoded.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

A computer program product version of the present embodiments as denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. It should be clear that with computer we mean any device capable of doing the data computations, i.e. it may also be e.g. a mobile phone. Also apparatus claims may cover computer-implemented versions of the embodiments.

Some of the steps required for the operation of the method may be already present in the functionality of the processor instead of described in the computer program product, such as data input and output steps.

It should be noted that the above-mentioned embodiments illustrate rather than limit the invention. Where the skilled person can easily realize a mapping of the presented examples to other regions of the claims, we have for conciseness not mentioned all these options in-depth. Apart from combinations of elements of the invention as combined in the claims, other combinations of the elements are possible. Any combination of elements can be realized in a single dedicated element.

Any reference sign between parentheses in the claim is not intended for limiting the claim. The word "comprising" does not exclude the presence of elements or aspects not listed in a claim. The word "a" or "an" preceding an element does not exclude the presence of a plurality of such elements.

The invention claimed is:

1. An image decoder comprising:
    a deformatter circuit, wherein the deformatter circuit is arranged to obtain a compressed pixellized lower dynamic range image and parameter data from the image signal;
    a decompressor circuit, wherein the decompressor circuit is arranged to apply at least an inverse DCT transform to the compressed pixellized lower dynamic range image to obtain a pixellized lower dynamic range image; and
    a dynamic range conversion circuit, wherein the dynamic range conversion circuit is arranged to transform the lower dynamic range image into a reconstructed high dynamic range image, wherein the dynamic range conversion circuit comprises:
        an arbitrary tone mapping circuit,
            wherein the arbitrary tone mapping circuit is arranged to apply an arbitrary monotonically increasing tone mapping,
            wherein the parameters which define the arbitrary monotonically increasing tone mapping are received in the parameter data; and
        a log gamma conversion circuit, wherein the log gamma conversion circuit is arranged to apply a log gamma mapping,
        wherein the arbitrary tone mapping circuit is connected to the log gamma conversion circuit.

2. The image decoder as claimed in claim 1, wherein the log gamma conversion circuit applies a function of the form:

$$xg = \frac{(\text{power}(RHO, v) - 1)}{(RHO - 1)},$$

wherein v is a pixel luma, and RHO is a real-valued or integer parameter received in the parameter data or calculable from the parameter data, followed by a power function with an exponent gamma.

3. The image decoder as claimed in claim 1, further comprising a tone remapping circuit,
wherein the tone remapping circuit is arranged to apply a further tone mapping, the further tone mapping received in the image signal, to the lower dynamic range image so as to obtain a second lower dynamic range image which reverses a code redistribution action,
wherein there is a second low dynamic range image with redistributed lumas for obtaining a reduced banding in at least a region of the reconstructed high dynamic range image.

4. The image decoder as claimed in claim 1, in which the deformatter circuit is arranged to obtain from the parameter data information defining the shape of the log gamma function.

5. A method of decoding a high dynamic range image signal comprising:
obtaining a compressed pixellized lower dynamic range image and parameter data from the high dynamic range image signal;
decompressing the compressed pixellized lower dynamic range image by applying at least an inverse DCT transform to the compressed pixellized lower dynamic range image to obtain a pixellized lower dynamic range image; and
transforming the lower dynamic range image into a reconstructed high dynamic range image wherein the transforming comprises:
applying an arbitrary monotonically increasing tone mapping, wherein the parameters which define the arbitrary monotonically increasing tone mapping are received in the parameter data; and
applying a log gamma mapping.

6. The method as claimed in claim 5,
wherein the log gamma mapping is defined as $$v = \frac{\log(1 + (RHO - 1) * xg)}{\log(RHO)},$$

wherein RHO is a received value or calculable from a received value;
followed by a power function with an exponent gamma.

7. The method as claimed in claim 5, wherein a power function calculation uses a gamma value equal to 1/(2.4).

8. The method as claimed in claim 5, further comprising determining a gain value, wherein the gain value is arranged to map the maximum luma of the lower dynamic range image to a specific value of the possible values in the reconstructed high dynamic range image.

9. The method as claimed in claim 8, further comprising:
after applying one or more of the arbitrary monotonically increasing tone mapping function and the mapping the maximum luma of the lower dynamic range image to a specific value of the possible values to determine the lower dynamic range image, applying a technical tone mapping to determine a second lower dynamic range image,
wherein the second lower dynamic range image can be used to drive LDR displays as an alternative driving image alternative to the lower luminance dynamic range image,
wherein technical tone mapping is determined by:
determining a first geometrical region of the lower luminance dynamic range image for which the visibility of banding in the corresponding reconstructed high dynamic range image is above an acceptable level;
determining a first range of lumas for the first geometrical region;
determining a second range of lumas adjacent on the luma axis to the first range of lumas,
wherein the second range of lumas is identified to fulfill the conditions that it has a number of lumas above a minimum number,
wherein the second range of lumas corresponds to a second geometrical region,
wherein the second geometrical region contains a texture which can be represented using less than the minimum number of codes in an LDR image upon which to apply the functions yielding a reconstructed high dynamic range image of sufficient visual quality for that second geometrical region; and
determining a redistribution mapping function, wherein the redistribution mapping function redistributes the lumas of the first range of lumas and the second range of lumas, so that additional codes are available for the first range of lumas; and
outputting in the image signal values encoding the function shape of the redistribution mapping.

10. The method as claimed in claim 9, wherein the amount of additional codes for the first range of lumas is determined based on a banding visibility criterion for the first geometrical region.

11. The method as claimed in claim 9,
wherein an identification of the first geometrical region is performed by a human grader via a user interface circuit,
wherein the amount of banding of the first geometrical region in the reconstructed high dynamic range image, and the visual quality of reconstruction of the second geometrical region in the reconstructed high dynamic range image are judged by the human grader as acceptable or unacceptable,
wherein in case of the acceptable judgement the values encoding the function shape of the redistribution mapping function or its inverse are encoded in the image signal, or in case of the inacceptable judgement the steps as claimed in claim 5 are repeated with different parameters to come to an alternative redistribution mapping function.

12. The method as claimed in claim 11,
wherein the pixel colors of the lower luminance dynamic range image are encoded as a luma channel,
wherein and u' and v' color coordinates are calculated as $$u' = \frac{4X}{X + 15Y + 3Z}, \text{ and } v' = \frac{9Y}{X + 15Y + 3Z},$$

with X,Y and Z being the device independent 1931 CIE color coordinates which are derivable for any RGB representation.

* * * * *